United States Patent
Lee et al.

(10) Patent No.: US 8,463,241 B2
(45) Date of Patent: Jun. 11, 2013

(54) METHOD AND APPARATUS FOR REPORTING RECEPTION RATIO OF STREAMING SERVICE BY TERMINAL IN A MOBILE BROADCASTING SYSTEM, AND SYSTEM THEREOF

(75) Inventors: Jong-Hyo Lee, Pyeongtaek-si (KR); Sung-Oh Hwang, Youngin-si (KR); Kook-Heui Lee, Youngin-si (KR); Bo-Sun Jung, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1040 days.

(21) Appl. No.: 11/840,752

(22) Filed: Aug. 17, 2007

(65) Prior Publication Data
US 2008/0045185 A1    Feb. 21, 2008

(30) Foreign Application Priority Data

Aug. 18, 2006 (KR) .................. 10-2006-0078411
Nov. 7, 2006 (KR) .................. 10-2006-0109692

(51) Int. Cl.
*H04M 1/725* (2006.01)
*H04B 17/00* (2006.01)
*H04W 24/00* (2009.01)
*H04W 4/00* (2009.01)

(52) U.S. Cl.
USPC ............... 455/412.2; 455/67.13; 455/425; 370/338

(58) Field of Classification Search
USPC ......... 455/412.2, 412.1, 67.11, 67.13, 423, 455/424, 425; 370/338, 328
See application file for complete search history.

(56) References Cited

U.S. PATENT DOCUMENTS

| | | | |
|---|---|---|---|
| 5,404,355 A | 4/1995 | Raith | |
| 5,546,411 A | 8/1996 | Leitch et al. | |
| 7,072,305 B1 | 7/2006 | Gregson | |
| 7,430,179 B2 * | 9/2008 | Towns-von Stauber et al. | ............. 370/252 |
| 2002/0004841 A1 | 1/2002 | Sawatari | |
| 2002/0021700 A1 * | 2/2002 | Hata et al. | ............. 370/395.42 |

(Continued)

FOREIGN PATENT DOCUMENTS

| | | |
|---|---|---|
| EP | 1 507 369 | 2/2005 |
| KR | 1020030032875 | 4/2003 |

(Continued)

OTHER PUBLICATIONS

H. Schulzrinne et al., "RTP: A Transport Protocol for Real-Time Applications", Network Working Group, IETF Standard, XP015009332, Jul. 1, 2003.

(Continued)

*Primary Examiner* — Christopher M Brandt
(74) *Attorney, Agent, or Firm* — The Farrell Law Firm, P.C.

(57) ABSTRACT

A system for reporting a reception ratio of a broadcast service in a broadcasting system. A network entity sends a reception ratio report indication message indicating at least one measurement type of a reception ratio for a broadcast streaming service. A terminal receives the reception ratio report indication message, and sends a reception ratio report message including the reception ratio indicative of a ratio of an expectedTotalPackets indicating a total number of packets that the terminal expects to receive for a reception ratio measurement interval according to a measurement type indicated by the reception ratio report indication message, to a receivedTotalPackets indicating a total number of packets that the terminal has received for the reception ratio measurement interval.

42 Claims, 12 Drawing Sheets

U.S. PATENT DOCUMENTS

| | | | |
|---|---|---|---|
| 2002/0188723 A1* | 12/2002 | Choi et al. | 709/225 |
| 2003/0046708 A1 | 3/2003 | Jutzi | |
| 2003/0142629 A1 | 7/2003 | Krishnamurthi et al. | |
| 2004/0078624 A1* | 4/2004 | Maxemchuk et al. | 714/4 |
| 2004/0117841 A1 | 6/2004 | Urakoshi | |
| 2004/0143661 A1* | 7/2004 | Higashi et al. | 709/224 |
| 2004/0165527 A1* | 8/2004 | Gu et al. | 370/229 |
| 2004/0252701 A1* | 12/2004 | Anandakumar et al. | 370/395.21 |
| 2005/0089043 A1* | 4/2005 | Seckin et al. | 370/395.21 |
| 2005/0176385 A1* | 8/2005 | Stern-Berkowitz et al. | 455/101 |
| 2005/0204052 A1* | 9/2005 | Wang et al. | 709/231 |
| 2007/0097987 A1* | 5/2007 | Rey et al. | 370/395.52 |
| 2007/0237098 A1* | 10/2007 | Wang | 370/256 |
| 2007/0239820 A1* | 10/2007 | Zhong et al. | 709/201 |
| 2007/0297331 A1* | 12/2007 | Tidwell | 370/232 |

FOREIGN PATENT DOCUMENTS

| | | |
|---|---|---|
| KR | 1020060135465 | 12/2006 |
| KR | 100677511 | 1/2007 |
| RU | 2 149 518 | 5/2000 |
| RU | 2004 121 141 | 1/2006 |
| WO | WO 01/89162 | 11/2001 |
| WO | WO 2006/012946 | 2/2006 |
| WO | WO 2006/034818 | 4/2006 |
| WO | WO 2006/034819 | 4/2006 |
| WO | WO 2006/080804 | 8/2006 |

OTHER PUBLICATIONS 07016184.9-2223 European Search Report issued on Sep. 12, 2011 (pp. 7).

2009-525487 Japanese Office Action issued on Aug. 2, 2011 (pp. 2).

* cited by examiner

METHOD AND APPARATUS FOR REPORTING RECEPTION RATIO OF STREAMING SERVICE BY TERMINAL IN A MOBILE BROADCASTING SYSTEM, AND SYSTEM THEREOF

PRIORITY

This application claims priority under 35 U.S.C. §119(a) of Korean Patent Applications filed in the Korean Intellectual Property Office on Aug. 18, 2006 and assigned Serial No. 2006-78411, and on Nov. 7, 2006 and assigned Serial No. 2006-109692, respectively, the contents of both of which are incorporated herein by reference.

BACKGROUND OF THE INVENTION

1. Field of the Invention

The present invention relates generally to a method and apparatus for providing broadcast services in a broadcasting system and system thereof, and in particular, to a method and apparatus for reporting a reception ratio of a streaming service in a broadcasting system and system thereof.

2. Description of the Related Art

The broadcasting system, as used herein, refers to a mobile broadcasting system that provides broadcast services to terminals. The mobile communication market constantly faces the need for production of new services through recombination or integration of the existing technologies. Today, due to the development of communication and broadcast technologies, the conventional broadcasting system has reached the phase of providing broadcast services through mobile terminals (hereinafter terminals) such as mobile phones and Personal Digital Assistants (PDAs). Convergence of mobile communication service and Internet Protocol (IP) technology is now the mainstream of the next generation mobile communication technology in harmony with the latent market needs, the increasing user demand for multimedia services, the strategy of the service providers for providing new services like the broadcast service in addition to the existing voice service, and the interests of the Information Technology (IT) companies that are reinforcing their mobile communication business to meet the user demands.

Open Mobile Alliance (OMA), which is a group assembled to study the standard for the inter-working between individual mobile solutions, mainly handles establishing various application standards for mobile games, Internet service, and the like. In particular, OMA Browser and Content (BAC) Mobile Broadcast (BCAST) Sub Working Group, one of the OMA working groups, is studying the technology that provides broadcast services to mobile terminals.

In a mobile broadcasting system being discussed in the OMA BCAST Working Group, a terminal for receiving a broadcast service should receive service guide information in which service description information, service charging information and service reception method information are included, and the terminal receives a corresponding service using the service guide information.

FIG. 1 illustrates architecture of a conventional mobile broadcasting system, and particularly, a logical architecture of each working group in the BCAST system that establishes standard technologies of an application layer and its lower transport layer to provide mobile broadcast service.

A detailed description will first be made of logical entities shown in FIG. 1. A Content Creation entity (CC) 101 provides contents, which are the basis of a BCAST service, and the contents can include a file for a normal broadcast service, for example, data for movie, audio and video. In addition, the Content Creation entity 101 provides, to a BCAST Service Application entity 102, attributes for the contents, provided for generating a service guide and determining a transport bearer over which the service will be delivered.

The BCAST Service Application entity 102 receives the data for the BCAST service from the Content Creation entity 101 and processes the received data in the format suitable for media encoding, content protection and interactive service. In addition, the BCAST Service Application entity 102 provides the attributes for the contents provided from the Content Creation entity 101 to a BCAST Service Distribution/Adaptation entity 103 and a BCAST Subscription Management entity 104. The BCAST Service Distribution/Adaptation entity 103 performs file/streaming delivery, service collection, service protection, service guide generation/delivery and service notification operations using the BCAST service data provided from the BCAST Service Application entity 102. In addition, the BCAST Service Distribution/Adaptation entity 103 adapts the service to be suitable for a Broadcast Distribution System (BDS) 112.

The BCAST Subscription Management Entity 104 manages service provisioning such as a subscription/charging-related function of a BCAST service user, provisioning of information used for the BCAST service, and a terminal receiving the BCAST service, in a hardware/software manner. A Terminal 105 receives contents and program support information such as service guide and content protection, and provides a broadcast service to the user. A BDS Service Distribution entity 111 delivers a mobile broadcast service to multiple terminals through communication with the Broadcast Distribution System 112 and an Interaction Network 113.

The Broadcast Distribution System 112 delivers a mobile broadcast service over a broadcast channel, and the mobile broadcast service can include, for example, Multimedia Broadcast Multicast Service (MBMS) of $3^{rd}$ Generation Project Partnership (3GPP), Broadcast Multicast Service (BCMCS) of $3^{rd}$ Generation Project Partnership 2 (3GPP2), and DVB-Handheld (DVB-H) of Digital Video Broadcasting (DVB). The Broadcast Distribution System 112 can be an IP-based broadcast/communication network. The Interaction Network 113 provides an interaction channel, and can be, for example, a cellular network.

A description will now be made of reference points, which are connection paths between the logical entities. The reference points have multiple interfaces according to their purposes. The interfaces are used for communication between more than two logical entities, and the message format and protocol for them are applied to a particular purpose.

Referring to FIG. 1, BCAST-1 121 is a transmission path for contents and content attributes, and BCAST-2 122 is a transmission path for a content-protected/content-unprotected BCAST service, and attributes and content attributes of the BCAST service. BCAST-3 123 is a transmission path for attributes of a BCAST service, content attributes, user preference/subscription information, user request, and response to the request. BCAST-4 124 is a transmission path for notification message, attributes used for a service guide, and key used for content protection and service protection.

BCAST-5 125 is a transmission path for service-protected BCAST service, service-unprotected BCAST service, content-protected BCAST service, content-unprotected BCAST service, BCAST service attributes, content attributes, notification, service guide, security material such as Digital Right Management (DRM) Right Object (RO) and key value used for BCAST service protection, and all data and signals transmitted over a broadcast channel.

BCAST-6 126 is a transmission path for service-protected BCAST service, service-unprotected BCAST service, content-protected BCAST service, content-unprotected BCAST service, BCAST service attributes, content attributes, notification, service guide, security material such as DRM RO and key value used for BCAST service protection, and all data and signals transmitted over an interaction channel.

BCAST-7 127 is a transmission path for service provisioning, subscription information, device management, and user preference information transmitted over an interaction channel of control information related to reception of security material such as DRM RO and key value used for BCAST service protection. BCAST-8 128 is a transmission path with which user data for a BCAST service interacts. BDS-1 129 is a transmission path for service-protected BCAST service, service-unprotected BCAST service, BCAST service attributes, content attributes, notification, service guide, and security material such as DRM RO and key value used for BCAST service protection.

BDS-2 130 is a transmission path for service provisioning, subscription information, device management, and security material such as DRM RO and key value used for BCAST service protection. X-1 131 is a reference point between the BDS Service Distribution Entity 111 and the Broadcast Distribution System 112. X-2 132 is a reference point between the BDS Service Distribution Entity 111 and the Interaction Network 113. X-3 133 is a reference point between the Broadcast Distribution System 112 and the Terminal 105. X-4 134 is a reference point between the BDS Service Distribution Entity 111 and the Terminal 105 over a broadcast channel. X-5 135 is a reference point between the BDS Service Distribution Entity 111 and the Terminal 105 over an interaction channel. X-6 136 is a reference point between the Interaction Network 113 and the Terminal 105.

FIG. 2 illustrates a structure of a service guide used for receiving a broadcast service in a conventional mobile broadcasting system. This structure is for providing a broadcast service to a terminal in the BCAST system. One service guide is composed of fragments having their own purposes, and the fragments are divided into 4 groups according to usage.

In FIG. 2, the service guide is composed of an Administrative group 200, a Provisioning group 210, a Core group 220 and an Access group 230. A solid line connecting the fragments indicates a cross-reference between the fragments.

The Administrative group 200 is for providing basic information used by the terminal to receive the service guide, and includes a Service Guide Delivery Descriptor fragment 201. The Service Guide Delivery Descriptor fragment 201 provides service guide IDentifier (ID), identification information of the service provider that has generated and delivered the service guide, and entire information of the service guide. In addition, the Service Guide Delivery Descriptor fragment 201 provides, to the terminal, scheduling information, update information, and information on a channel over which it can receive multiple service guide fragments, so that the terminal can receive only the necessary service guide at an appropriate time.

The Provisioning group 210 is for providing charging information for service reception. The Provisioning group 210 includes a Purchase Item fragment 211, a Purchase Data fragment 212 and a Purchase Channel fragment 213. The Purchase Item fragment 211 provides charging information for service or service bundle. The Purchase Data fragment 212 indicates actual price information for the purchased item. The Purchase Channel fragment 213 provides information on the system and payment method by which the service user can actually purchase the service.

The Core group 220 is for providing information on the service itself, and includes a Service fragment 221, a Schedule fragment 222 and a Content fragment 223. The Service fragment 221 provides a description of the service itself that the user will receive, and information on the contents, of which the service can be composed. The Schedule fragment 222 provides information on the time for which the service can be provided and used. The Content fragment 223 provides information on each of multiple contents constituting the service.

The Access group 230 includes an Access fragment 231 and a Session Description fragment 232. The Access group 230 provides service access information for receiving the services provided through the Core group 220, and detailed information on the session for which the contents constituting the corresponding service are delivered, thereby allowing the terminal to access the corresponding service.

The Access fragment 231 provides multiple access methods to the terminal for one service, thereby providing a method in which the terminal can access various supplementary services based on one service. The Session Description fragment 232 provides session information for a service defined in one Access fragment. In addition to the four groups described above, the service guide information, as shown in FIG. 2, can further include a Preview Data fragment 224 for providing the preview and icon for the service and contents, and an Interactivity Data fragment 225 for supporting an interactivity service.

Generally, the broadcasting system, as it is a unidirectional system, does not monitor whether the broadcast service has normally been delivered to the recipients. However, if it is possible to adjust a coding rate and/or a data rate of a broadcast service, the broadcasting system can receive a reception ratio fed back from the terminal and analyze the reception ratio, thereby providing the broadcast service with higher quality. Particularly, in an environment such as the mobile broadcasting system, where terminals frequently move and their reception ratios frequently change, the system can provide higher-quality broadcast service to the users by appropriately handling the frequent movement and the frequent change in the reception ratio depending on the report on the reception ratio. In addition, for the high-price mobile broadcast service, the quality of the reception ratio should be taken into full consideration.

Based on the reception ratio report, the broadcasting system can adjust the broadcast quality to be suitable for the reception environment during transmission. However, in the broadcast standards proposed up to now, there is no definition of the detailed operation of the terminal and broadcasting system for the reception ratio report, and the message for the reception ratio report.

SUMMARY OF THE INVENTION

An aspect of the present invention is to address at least the problems and/or disadvantages and to provide at least the advantages described below. Accordingly, an aspect of the present invention is to provide a method and apparatus for reporting a reception ratio of a broadcast service to a broadcasting system, and system thereof.

An aspect of the present invention is to provide a method and apparatus for reporting a reception ratio of a streaming service by a terminal in a mobile broadcasting system, and system thereof.

An aspect of the present invention is to provide a method and apparatus for measuring a reception ratio by a terminal in a broadcasting system, and system thereof.

According to the present invention, there is provided a system for reporting a reception ratio of a broadcast service in a broadcasting system. The system includes a network entity for sending a reception ratio report indication message indicating at least one measurement type of a reception ratio for a broadcast streaming service, and a terminal for receiving the reception ratio report indication message, and sending a reception ratio report message including the reception ratio indicative of a ratio of an expectedTotalPackets indicating a total number of packets that the terminal expects to receive for a reception ratio measurement interval according to a measurement type indicated by the reception ratio report indication message, to a receivedTotalPackets indicating a total number of packets that the terminal has received for the reception ratio measurement interval.

According to the present invention, there is provided a method for reporting a reception ratio of a broadcast service by a terminal in a broadcasting system. The method includes receiving a reception ratio report indication message indicating at least one measurement type of a reception ratio for a broadcast streaming service, measuring a reception ratio indicative of a ratio of an expectedTotalPackets indicating a total number of packets that the terminal expects to receive for a reception ratio measurement interval according to a reception ratio measurement type indicated by the reception ratio report indication message, to a receivedTotalPackets indicating a total number of packets that the terminal has received for the reception ratio measurement interval; and sending the reception ratio report message including the measured reception ratio.

According to the present invention, there is provided a method for receiving a report on a broadcast service reception ratio from a terminal by a network entity. The method includes determining at least one measurement type of a reception ratio for a broadcast streaming service, sending to the terminal a reception ratio report indication message indicating the determined measurement type, and receiving from the terminal a reception ratio report message including the reception ratio indicative of a ratio of an expectedTotalPackets indicating a total number of packets that the terminal expects to receive for a reception ratio measurement interval according to the measurement type, to a receivedTotalPackets indicating a total number of packets that the terminal has received for the reception ratio measurement interval.

According to the present invention, there is provided a terminal apparatus for reporting a reception ratio of a broadcast service in a broadcasting system. The terminal includes a receiver for receiving a reception ratio report indication message indicating at least one measurement type of a reception ratio for a broadcast streaming service, a controller for measuring a reception ratio indicative of a ratio of an expectedTotalPackets indicating a total number of packets that the terminal expects to receive for a reception ratio measurement interval according to a reception ratio measurement type indicated by the reception ratio report indication message, to a receivedTotalPackets indicating a total number of packets that the terminal has received for the reception ratio measurement interval, and a transmitter for sending the reception ratio report message including the measured reception ratio.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
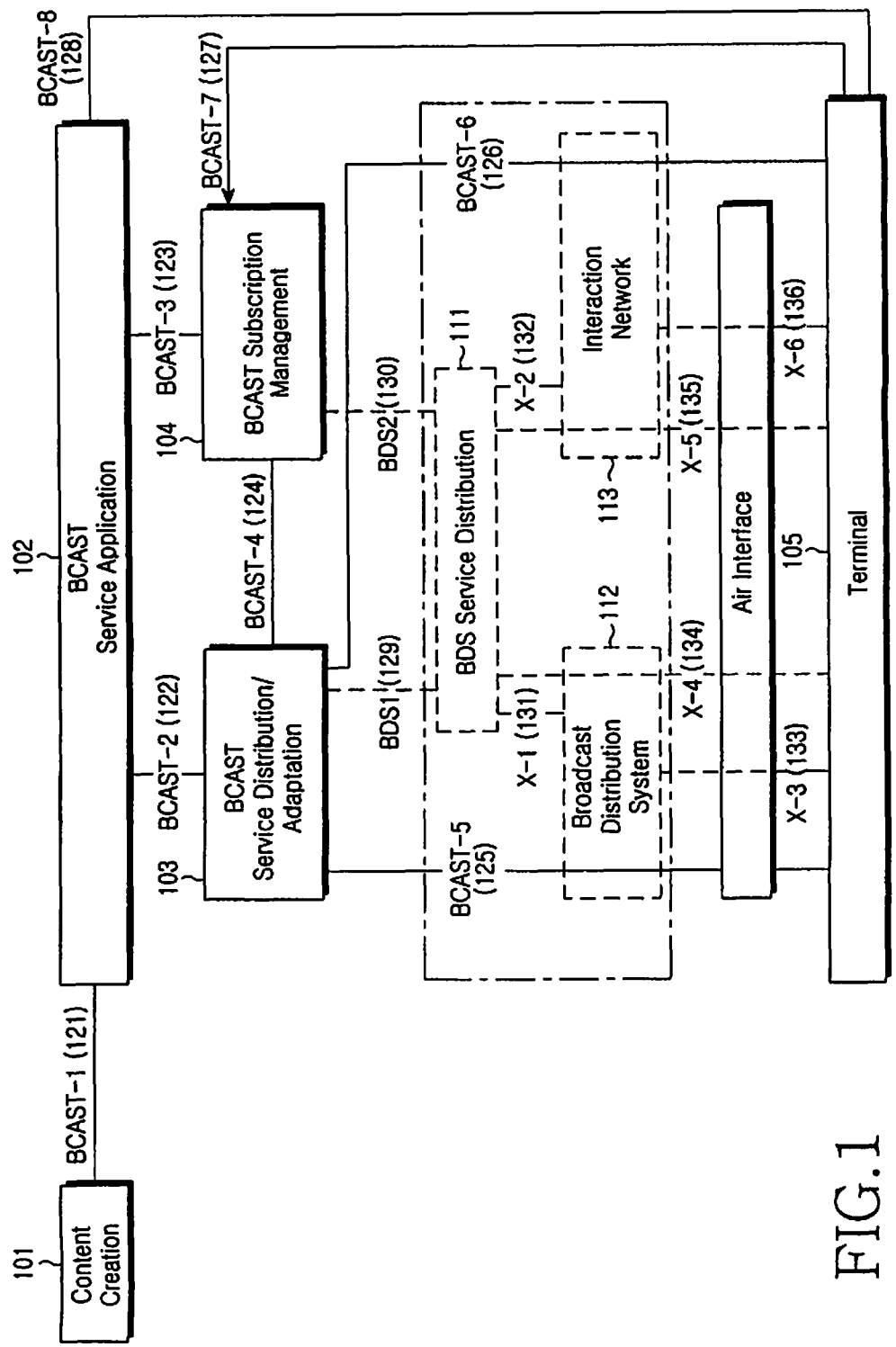
FIG. 1 illustrates architecture of a conventional mobile broadcasting system.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for the sake of clarity and conciseness.

Although embodiments of the present invention will be described herein with reference to the BCAST system, one of the mobile broadcast technology standards, it is not intended to limit of the scope of the present invention to the BCAST system. That is, it should be noted herein that the broadcasting system includes various communication systems supporting a broadcast service, such as the BCAST system and the Digital Video Broadcasting-Handheld (DVB-H) system. In addition, although the names of the entities defined in 3GPP, the asynchronous mobile communication standard, and/or in OMA BCAST, the standard group for application of terminal, will be used for a description of the present invention, it is not intended to limit the scope of the present invention to the standards and the names of the entities. Further, although a receiver of the BCAST system supporting the mobile broadcast service will be referred to herein as a mobile terminal, for convenience, the technical spirit of the present invention can also be applied to the wired communication system.

In the BCAST system, the terminal according to the present invention is constructed to measure a loss ratio and a reception ratio of a Real-time Transport Protocol (RTP) packet in which a streaming service is delivered, and reports the measured ratios to the BCAST Service Distribution/Adaptation (BSDA). The term 'packet loss ratio' as used herein indicates a ratio of the total number of packets that should have been received for a measurement interval, to the number of lost packets, and the term 'reception ratio' indicates a ratio of the total number of packets that should have been received for a measurement interval, to the number of actually received packets. For the details related to delivery of a streaming service in the BCAST system, reference can be made to http://www.openmobilealliance.org/ftp/Public_documents/BAC/BCAST/Perman ent_documents/OMA-TS-BCAST-Distribution-V1_0_0-20060313-D.zip.

Figure 3:
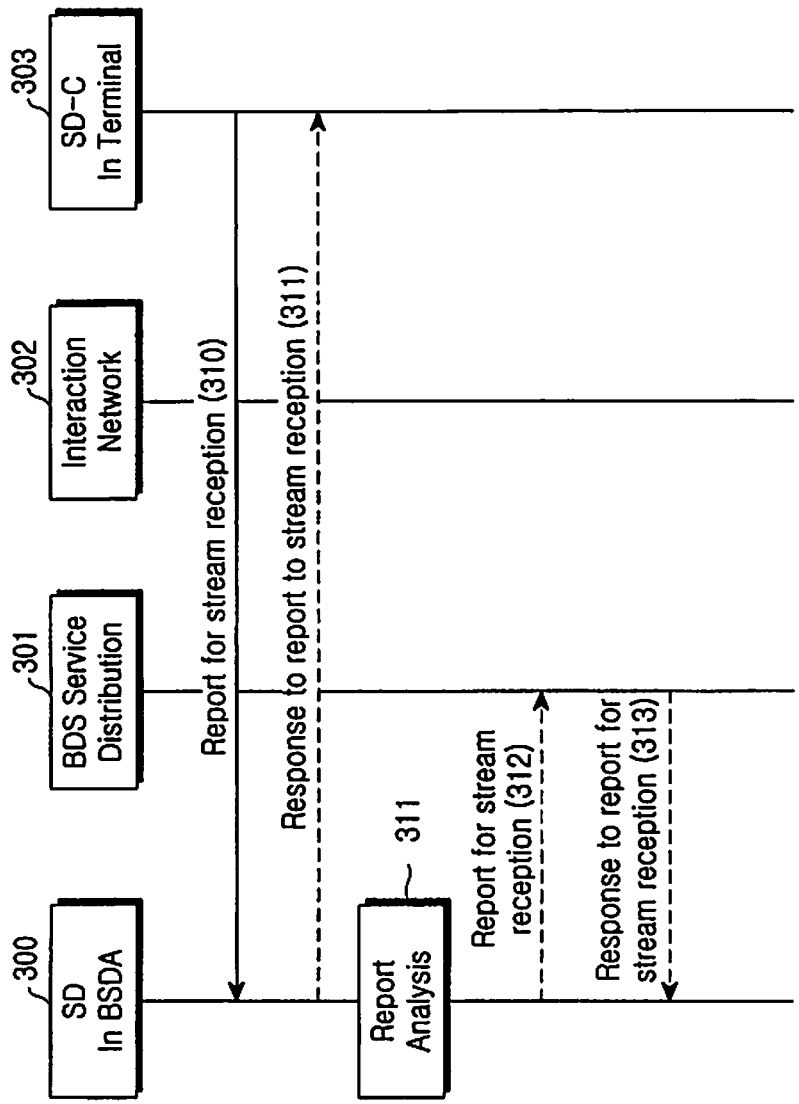
FIG. 3 illustrates a reception ratio report procedure for a streaming service in a mobile broadcasting system to which the present invention is applicable.

FIG. 3 illustrates a reception ratio report procedure for a streaming service in a mobile broadcasting system to which the present invention is applicable. Shown is the reception ratio report procedure defined in the BCAST system.

Referring to FIG. 3, Stream Distribution (SD) in BSDA 300, a service entity included in the BCAST Service Distribution/Adaptation Entity 103 shown in FIG. 1, performs a function of broadcasting a streaming service. BDS Service Distribution 301 is identical to the BDS Service Distribution entity 111 described in FIG. 1, and Interaction Network 302 is identical to the Interaction Network 113 described in FIG. 1. Stream Distribution-Client (SD-C) in Terminal 303, an entity included in the Terminal 105 of FIG. 1, controls streaming service reception. For convenience, the SD in BSDA 300 and the SD-C in Terminal 303 will be referred to as BSDA 300 and Terminal 303, respectively.

If the Terminal 303 reports a reception ratio of a broadcast service to the BSDA 300 in step 310, the BSDA 300, a network entity, sends a message for acknowledging the reception ratio report (reception report) to the Terminal 303 in step 311. In step 312, the BSDA 300 can report the reception ratio of the Terminal 303 to the BDS Service Distribution 301 to request quality improvement of the reception ratio. The operations of steps 311 and 312 are optional. In step 313, the BDS Service Distribution 301 sends a response for requesting quality improvement of the reception ratio to the BSDA 300. The present invention defines a process in which the terminal reports a reception ratio to the BSDA and the BSDA sends a response to the terminal as performed in steps 310 and 311 of FIG. 3, and also defines a detailed operation performed before the process. However, the present invention will omit discussion on an operation in which reception ratio report/response between the BSDA and the BDS Service Distribution is performed in steps 312 and 313 of FIG. 3.

Before a description of a reception ratio report method for a streaming service in the BCAST system according to an embodiment of the present invention is given, a description of items to be used in the existing BCAST service guide will be made for a better understanding of the present invention.

Figure 2:
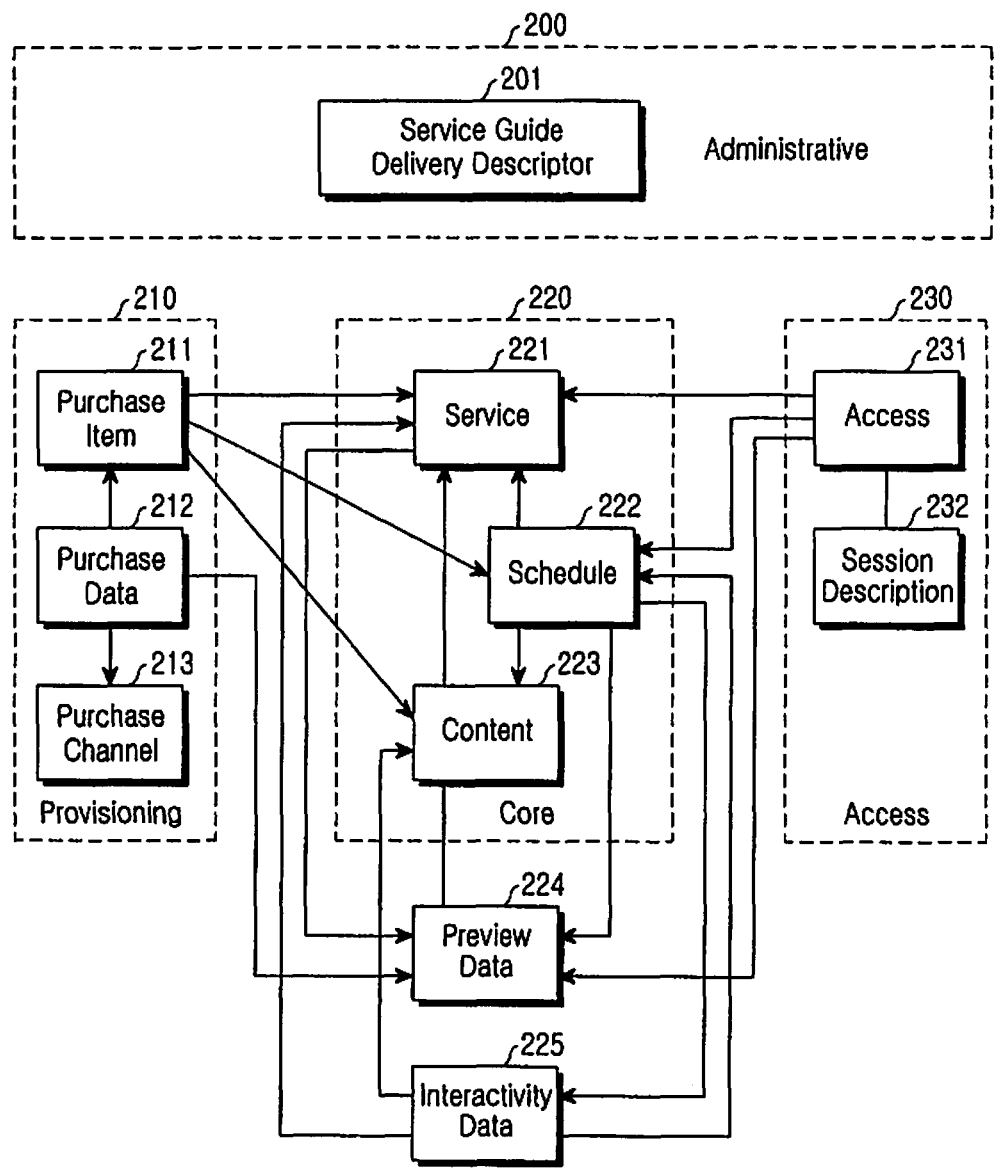
FIG. 2 illustrates a structure of a service guide used for receiving a broadcast service in a conventional mobile broadcasting system.

Tables 1 and 2 show only the parts necessary for a description of the present invention, in the Access fragment 231 of the service guide described in FIG. 2. For a description of all fragments and a description of the service guide, reference can be made to http://www.openmobilealliance.org/ftp/Public_documents/BAC/BCAST/Perman ent_documents/OMA-TS-BCAST_Service-Guide-V1_0_0-20060324-D.zip.

TABLE 1

| Name | Type | Category | Cardinality | Description | Data Type |
|---|---|---|---|---|---|
| | | | Omitted | | |
| Session Description Reference | E3 | NO/TM | 0 ... N | The reference to the SessionDescription this access relates to. Note: the SessionDescription itself may be delivered in two ways via broadcast or via fetch over interaction channel. In the case of broadcast delivery, the SessionDescription fragment is either delivered in SGDU or encapsulated in this Access fragment. In the latter case the SDP element is used instead of the Session Description Reference. If AuxiliaryDescription fragments are provided they are referenced by the SessionDescriptionReference. In the case of fetch over interaction channel, the Session Description can be acquired by accessing the URI (given as attribute of this element). Attributes: type URI idRef | |

TABLE 2

| Name | Type | Category | Cardinality | Description | Data Type |
|---|---|---|---|---|---|
| type | A | NM/TM | 1 | Type of the session description referred by this SessionDescriptionReference 1 - SDP 2 - MBMS User Service Description (MBMS-USD) as specified in [26.346] section 5.2. It may contain one or several SDP descriptions. | unsignedByte (8 bits) |

TABLE 2-continued

| Name | Type | Category | Cardinality | Description | Data Type |
|------|------|----------|-------------|-------------|-----------|
| URI | A | NO/TM | 0 . . . 1 | The URI to the file containing SessionDescription that the media application in the terminal uses to access the service. | anyURI |

Omitted

Referring to Table 1 and Table 2, 'Name' indicates names of elements and attributes constituting a corresponding message. 'Type' indicates whether a type of the corresponding name is element or attribute. The elements have values E1, E2, E3 and E4, wherein E1 indicates an upper element for the entire message, E2 indicates a sub-element of E1, E3 indicates a sub-element of E2, and E4 indicates a sub-element of E3. The attribute is denoted as 'A', and 'A' indicates an attribute of the corresponding element. For example, 'A' under E1 indicates an attribute of E1 'Category' is used for indicating whether the corresponding element/attribute is mandatory. The corresponding element/attribute has a value M (Mandatory), when it is mandatory, and the corresponding element/attribute has a value O (Optional), when it is optional. 'Cardinality' indicates the relationship between the element, and has values 0, 0 . . . 1, 1, 0 . . . n, 1 . . . n, wherein '0' indicates an optional relationship, '1' indicates a mandatory relationship, and 'n' indicates possibility of having multiple values. For example, '0 . . . n' indicates that there can be no corresponding element, or the corresponding element can have n values. 'Description' indicates meaning of the corresponding element/attribute.

In Table 1, the "SessionDescriptionReference" element, an element for providing information on session setup necessary for reception of a broadcast service, has as a sub-attribute an attribute called Uniform Resource Identifier (URI) indicating the place where the session information is located. This attribute, although it generally indicates the position where session information for reception of a broadcast service is acquired, can be defined to be used to indicate other session information related to the service, and can also indicate the position where the reception ratio report information presented by the present invention can be acquired. In process of accessing an access fragment to receive a service after receiving a service guide, if there is the URI, the terminal receives and processes information having the corresponding URI. If the information received using the URI has reception ratio report information, the terminal measures a reception ratio for the broadcast service that it is receiving after decrypting the corresponding reception ratio report information, and reports the measured reception ratio to the BSDA of the broadcasting system.

Though not shown in FIG. 3, with reference to Tables 3 to 5, a definition will be given of a reception ratio report indication message with which the BSDA 300 instructs the Terminal 303 to report a reception ratio of a streaming service according to the present invention. The reception ratio report indication message, a message for the reception ratio report procedure, is composed of the elements and attributes described in Table 3 to Table 5, and can be expressed in a language such as Extensible Markup Language (XML).

TABLE 3

| Name | Type | Category | Cardinality | Description | Data Type |
|------|------|----------|-------------|-------------|-----------|
| StreamingAssociatedProcedure | E | | | Associated Delivery Procedure for Stream Delivery Contains the following element: MeasurementType | |
| MeasurementType | E1 | | | This element defines the type of measurement and reception report that should be executed by the terminal. Contains the following elements: SessionMeasurement FixedDurationMeasurement IntervalMeasurement ThresholdCheckingMeasurement EventTriggeredMeasurement | |
| SessionMeasurement | E2 | O | 0 . . . 1 | This element requests the terminal to send a reception report for the packet loss measurement of a complete session. | boolean |

As shown in Table 3, the uppermost element of the reception ratio report indication message for the streaming service that BSDA 300 delivers to the Terminal 303, is "StreamingAssociatedProcedure", and it indicates of which basic elements/attributes the indication message is composed, and finally indicates a type of the indication message. Among the elements included in the "StreamingAssociatedProcedure", "measurementType" is an element designating a reception ratio report type of the streaming service, and the terminal measures reception ratio and loss ratio of the streaming service in the method designated in the "measurementType", and reports the corresponding reception ratio if a condition is satisfied. The "measurementType" includes its sub-elements of SessionMeasurement, FixedDurationMeasurement, IntervalMeasurement, ThresholdMeasurement and EventTriggredMeasurement.

In Table 3, the "SessionMeasurement" element serves to instruct the Terminal 303 to report the reception ratio of the entire session for the service that it is now receiving or expects to receive. The Terminal 303 performs reception ratio measurement starting from the moment that it receives a first Real Time Transport Protocol (RTP) packet of its desired reception session, until the time the session ends, and reports the measurement result to the BSDA 300. If the Terminal 303 receives the service from the middle of the session, it measures the reception ratio from the time that it has started receiving the service, and reports the measurement result, and if the Terminal 303 ends the session in the middle thereof, it reports the reception ratio measurement result up to the time that it ends the session. In addition, if the Terminal 303 receives the service from the middle of the session and ends the session in the middle thereof, it measures reception ratios for the corresponding possible parts, and reports the measured reception ratios. A detailed description of the report method of the Terminal 303 will be made herein below.

In Table 4, the "FixedDurationMeasurement" element is an element by which the BSDA 300 designates and indicates, for the Terminal 303, a measurement interval for reception ratio report for the service that the corresponding terminal is now receiving or expects to receive. An RTP timestamp indicative of an RTP data sampling time is used herein as the measurement interval, and it designates startRTPTimestamp indicating a start timestamp, which is an attribute indicating a start point of the measurement interval, at which the reception ratio report is started, and an endRTPTimestamp indicating an end timestamp, which is an end point at which the measurement is ended. For the details of RTP, reference can be made to http://www.ietf.org/rfc/rfc 1889.txt. Upon receipt of the indication for the measurement interval from the BSDA 300, the Terminal 303 performs measurement starting from the value in the startRTPTimestamp up to the value of the endRTPTimestamp, and reports the measurement result to the BSDA 300.

If the Terminal 303 receives the service after the startRTPTimestamp, it performs measurement from its participation time and reports the measurement result. If the Terminal 303 ends the session before the endRTPTimestamp, it reports the measurement result up to the end time. In addition, if the Terminal 303 receives the service after the startRTPTimestamp and ends the session before the endRTPTimestamp, it performs measurement for the corresponding possible parts and reports the measurement results.

In Table 4, the "IntervalMeasurement" element is one by which the BSDA 300 instructs the Terminal 303 to report a reception ratio every period designated for the service that the corresponding terminal is now receiving or expects to receive. To this end, an interval value is designated in the "IntervalMeasurement" element, and the Terminal 303 measures a reception ratio by calculating an interval on the basis of timestamps of received RTP packets. The calculation of the interval starts from the moment that the Terminal 303 receives a first RTP packet, and the result is reported when the service received through the corresponding session ends or the Terminal 303 ends the service.

TABLE 4

| Name | Type | Category | Cardinality | Description | Data Type |
| --- | --- | --- | --- | --- | --- |
| FixedDuration Measurement | E2 | O | 0 . . . 1 | This element requests the terminal to send a reception report for the packet loss measurement of a fixed duration of time as defined in the following attributes. Contains the following attributes: startRTPTimestamp endRTPTimestamp | boolean |
| startRTPTimestamp | A | M | 1 | The start time of the RTP timestamp to begin the measurement. | unsignedInt |
| endRTPTimestamp | A | M | 1 | The end time of the RTP timestamp to finish the measurement. | unsignedInt |
| IntervalMeasurement | E2 | O | 0 . . . 1 | This element requests the terminal to send periodic reception reports for the packet loss measurement on a fixed interval basis. Contains the following attributes: Interval | Boolean |
| Interval | A | M | 1 | The interval at which the terminal should send reception reports. The start of the interval is calculated based on moment the terminal receives the first RTP packet. | unsignedInt |

TABLE 5

| Name | Type | Category | Cardinality | Description | Data Type |
|---|---|---|---|---|---|
| ThresholdMeasurement | E2 | O | 0 . . . 1 | This element requests the terminal to send a reception report for the packet loss measurements whenever the packet loss is greater than the designated threshold. | Boolean |
| threshold | A | M | 1 | The threshold value that the terminal should use to check whether it should send reception reports. The terminal will begin measurements when it receives the first packet but will only send reception reports when the threshold value is breached. | Float ?? |
| EventTriggered Measurement | E2 | O | 0 . . . 1 | This element requests the terminal to send a reception report for packet loss measurement after an event is triggered??? | Boolean |
| trigger | A | O | 0 . . . 1 | The trigger value that the terminal should use to check whether it should start to create data for a reception report. The terminal will begin measurements when it receives the first packet but will only send a reception report with data from when the trigger value was reached onwards. | Float?? |

In Table 5, the "ThresholdMeasurement" element is for instructing the Terminal 303 to report a measured reception ratio when a loss ratio measured for the service that the Terminal 303 is now receiving or expects to receive, is higher than a threshold designated by the BSDA 300. That is, when the "ThresholdMeasurement" element of Table 5 is set, the Terminal 303 reports the reception ratio measured when the measured loss ratio is greater than the "ThresholdMeasurement" element of Table 5.

The threshold can be a threshold not only for a packet loss ratio but also for the number of lost packets. The Terminal 303 continuously measures a reception ratio and a loss ratio from the time that it receives the service. If the measured loss ratio becomes less than the threshold over time, the Terminal 303 collects information for the reception ratio report, and if the loss ratio becomes greater than the threshold again, the Terminal 303 reports the reception ratio to the BSDA 300. That is, if the packet loss ratio is greater than the threshold, the Terminal 303 sends a reception ratio report message with the measured reception ratio to the BSDA 300. If the loss ratio becomes less than the threshold gain, the Terminal 303 re-performs information collection for the reception ratio report. The 'information collection for the reception ratio report' as used herein refers to an action of collecting the information necessary for measuring the reception ratio and loss ratio, such as startRTPTimestamp, endRTPTimestamp, interval, packet loss ratio, expectedTotalPackets, receivedTotalPackets and lostTotalPackets. The foregoing process continues until the Terminal 303 ends the corresponding service.

In Table 5, the "EventTriggeredMeasurement" element is for instructing the Terminal 303 to report the reception ratio when the loss ratio of the service that the Terminal 303 is now receiving or expects to receive, is greater than a trigger value designated by the BSDA 300. The Terminal 303 continuously measures a reception ratio and a loss ratio from the time that it receives the service. If the loss ratio becomes less than the trigger value over time, the Terminal 303 collects information for the reception ratio report, and if the loss ratio becomes greater the trigger value, the Terminal 303 includes the reception ratio collected up to the end time of the corresponding service in a reception ratio report message and sends the reception ratio report message to the BSDA 300.

Tables 6 to 8 show a format of a reception ratio report message with which the Terminal 303 reports a reception ratio of the streaming service according to a first embodiment of the present invention. The reception ratio report message is composed of the elements and attributes described in Table 6 to Table 8, and can be expressed in a language such as XML.

Unlike the reception ratio report indication message for the streaming service, defined in Table 3 to Table 5, the reception ratio report message for the streaming service, described in Table 6 to Table 8, is given in one format, and it is associated with all of the following 5 reception ratio measurement types.

TABLE 6

| Name | Type | Category | Cardinality | Description | Data Type |
|---|---|---|---|---|---|
| StreamingReceptionReport | E | | | Reception Report for Stream Delivery Contains the following attributes: reportType measurementStartRTPTimestamp measurementEndRTPTimestamp expectedTotalPacket receivedTotalPackets globalContentID sessionID globalServceID serverURI serviceArea cellID | |

TABLE 6-continued

| Name | Type | Category | Cardinality | Description | Data Type |
| --- | --- | --- | --- | --- | --- |
| reportType | A | M | 1 | Contains the following element: DeviceID The type of the reception report This denotes . . . Has the following values 0 - SessionMeasurement 1 - FixedDurationMeasurement 2 - IntervalMeasurement 3 - ThresholdCheckingMeasurement 4 - EventTriggeredMeasurement 3-127 reserved for future use 128-255 reserved for proprietary use | unsingedByte |

In Table 6, the "StreamingReceptionReport" element, the uppermost element of the reception ratio report message for the streaming service, has the following elements and attributes. The "reportType" element is used to report the BSDA 300 which reception ratio measurement type was used in the Terminal 303. Based on the "reportType", the BSDA 300 can determine the manner in which the reception ratio information received from the Terminal 303 was measured, and it can be used for classifying and analyzing the reception ratio.

TABLE 7

| Name | Type | Category | Cardinality | Description | Data Type |
| --- | --- | --- | --- | --- | --- |
| measurementStartRTPTimestamp | A | M | 1 | The start time of the RTP timestamp used for the measurement. | unsignedInt |
| measurementEndRTPTimestamp | A | M | 1 | The end time of the RTP timestamp used for the measurement. | unsignedInt |
| expectedTotalPackets | A | O | 0 . . . 1 | The total number of expected packets during measurement. | unsignedInt |
| receivedTotalPackets | A | O | 0 . . . 1 | The total number of successfully received packets during measurement. | unsignedInt |
| lostTotalPackets | A | O | 0 . . . 1 | The total number of packets lost during measurement. | unsignedInt |
| recpetionRatio | A | M | 1 | The reception ratio during the measurement period. Calculated from expectedTotalPackets and receivedTotalPackets. | Float?? |
| globalContentID | A | M | 1 | The identifier of the content that the measurement was performed on. | anyURI |
| sessionID | A | M | 1 | The identifier of the session that the measurement was performed on. | anyURI |

In Table 7, the "measurementStartRTPTimestamp" element and the "measurementEndRTPTimestamp" element indicate the start and end periods where the measurement was made for the reception ratio report, respectively. The two values indicate timestamp values of the first RTP packet and the last RTP packet that the Terminal 303 actually receives for the reception ratio measurement by receiving the service.

The "expectedTotalPackets", "receivedTotalPackets" and "lostTotalPackets" indicate the total number of expected packets (or the total number of packets that the Terminal 303 expects to receive, or the total number of packets that the Terminal 303 should have received for the measurement interval), the total number of packets that the Terminal 303 has actually received, and the total number of lost packets (or the total number of packets that underwent loss or error), respectively. The "expectedTotalPackets" is the total number of packets that the Terminal 303 expects to receive for the period from the time the Terminal 303 started the measurement until the end time of the measurement, and it can be obtained by calculating a difference between a timestamp of the start time and a timestamp of the end time. The "receivedTotalPackets" is the total number of packets that the Terminal 303 has actually received for the period in which it receives the "expectedTotalPackets". The "lostTotalPackets" is the total number of packets that the Terminal 303 has failed to receive for the period in which it receives the "expectedTotalPackets", or that the Terminal 303 has received but the received packets have undergone error. The foregoing three attributes are optional attributes, and can be reference information for reception ratio classification and analysis.

The "receptionRatio" attribute can be calculated depending on "expectedTotalPackets" and "receivedTotalPackets" or "lostTotalPackets", and indicates the total reception ratio occurred during the measurement interval. For example, the reception ratio receptionRatio can be calculated depending on a ratio of expectedTotalPackets to receivedTotalPackets. Therefore, as for the reception ratio, the BSDA 300 can comprehend the reception ratio of the Terminal 303 depending on the values in the foregoing attributes. Upon receipt of a report on the reception ratio from multiple terminals through the attribute values, the BSDA 300 can analyze the reception ratio and take an appropriate action for quality improvement necessary for the corresponding service, thereby improving the service quality. Based on the reception ratio information received from the Terminal 303, the BSDA 300 can later control the service delivery efficiency. For example, when the reception ratio is high, the BSDA 300 can reduce the error coding rate to allocate the remaining bandwidth to additional services.

The "globalContentID" is an identifier of the contents of the service that underwent reception ratio measurement, and is reported for use later for reception ratio classification and analysis in the BSDA 300. The "sessionID" is a session identifier of the service that underwent the reception ratio measurement, and is reported for use later for reception ratio classification and analysis in the BSDA 300.

identifier of the Terminal 303 that makes a reception ratio report, and it has, as its sub-attribute, a Type attribute indicating a type of the identifier. As the mobile broadcasting system such as BCAST can be used in various types of broadcast networks, there are various types of available terminals. Because not all of the terminals are compatible with each other, it is possible to notify the incompatibility using the Type attribute.

Tables 9 to 11 show a format of a reception ratio report message with which the Terminal 303 reports a reception ratio of the streaming service according to a second embodiment of the present invention. This embodiment is provided by considering a service model that can be composed of multiple sessions and/or multiple contents in one access frag-

TABLE 8

| Name | Type | Category | Cardinality | Description | Data Type |
|---|---|---|---|---|---|
| globalServiceID | A | M | 1 | The identifier of the service that the measurement was performed on. | anyURI |
| serverURI | A | M | 1 | The return address for the reception report. | anyURI |
| serviceArea | A | O | 0 . . . 1 | The area that the measurements were taken. | unsignedInt |
| cellID | A | O | 0 . . . 1 | The cell that the measurement were taken.<br>Note: Only applies to 3GPP/2 | unsignedInt |
| DeviceID | E1 | M | 1 | A unique device identification known to the BSM<br>Contains the following attribute:<br>Type | unsignedInt |
| Type | A | M | 1 | Specifies the type of device ID. The following values are allowed:<br>0 - DVB Device ID<br>1 - 3GPP Device ID (IMEI)<br>2 - 3GPP2 Device ID (MEID)<br>3-127 reserved for future use<br>128-255 reserved for proprietary use | unsignedByte |

In Table 8, the "globalServiceID" is an identifier of the service that underwent the reception ratio measurement, and is reported for use later for reception ratio classification and analysis in the BSDA 300. The "serverURI" indicates an address of the BSDA 300 that should receive a reception ratio report. The "serviceArea" indicates the position where the Terminal 303 has measured the reception ratio, can be used for selecting the low-reception ratio area and is optional. The "cellID" indicates the cell where the Terminal 303 has measured a reception ratio when the Terminal 303 is connected to a 3GPP/3GPP2 network, can be used for selecting the low-reception ratio area and is optional. The "DeviceID" is an ment. In addition, the reception ratio report message according to the second embodiment is composed of the elements and attributes described in Tables 9 to 11, and can be expressed in a language such as XML.

Unlike the reception ratio report message for the streaming service, described in Tables 6 to 8, the reception ratio report message for the streaming service, described in Tables 9 to 11, is a reception ratio report message to be associated with a transport session composed of multiple contents and/or multiple sessions, and it is associated with all of the 5 reception ratio measurement types defined in Tables 6 to 8.

TABLE 9

| Name | Type | Category | Cardinality | Description | Data Type |
|---|---|---|---|---|---|
| StreamingReceptionReport | E | | | Reception Report for Stream Delivery<br>Contains the following attributes:<br>serverURI<br>globalServiceID<br>Contains the following elements:<br>DeviceID<br>SessionID | |
| serverURI | A | M | 1 | The return address for the reception report. | anyURI |
| globalServiceID | A | M | 1 | The identifier of the service that the measurement was performed on. | anyURI |
| DeviceID | E1 | M | 1 | A unique device identification known to the BSM<br>Contains the following attribute:<br>type | unsignedInt |
| type | A | M | 1 | Specifies the type of device ID. The following values are allowed: | unsignedByte |

TABLE 9-continued

| Name | Type | Category | Cardinality | Description | Data Type |
|---|---|---|---|---|---|
| SessionID | E1 | M | 1 . . . n | 0 - DVB Device ID<br>1 - 3GPP Device ID (IMEI)<br>2 - 3GPP2 Device ID (MEID)<br>3-127 reserved for future use<br>128-255 reserved for proprietary use<br>The identifier of the session that the measurement was performed on.<br>Contains the following elements:<br>GlobalContentID | anyURI |

TABLE 10

| Name | Type | Category | Cardinality | Description | Data Type |
|---|---|---|---|---|---|
| GlobalContentID | E2 | M | 1 . . . n | The identifier of the content that the measurement was performed on.<br>Contains the following attributes:<br>reportType<br>measurementStartRTPTimestamp<br>measurementEndRTPTimestamp<br>expectedTotalPacket<br>receivedTotalPackets<br>lostTotalPackets<br>receptionRatio<br>serviceArea<br>cellID | anyURI |
| reportType | A | M | 1 | The type of the reception report<br>Has the following values<br>0 - SessionMeasurement<br>1 - FixedDurationMeasurement<br>2 - IntervalMeasurement<br>3 - ThresholdCheckingMeasurement<br>4 - EventTriggeredMeasurement<br>3-127 reserved for future use<br>128-255 reserved for proprietary use | unsingedByte |
| measurementStartRTPTimestamp | A | M | 1 | The start time of the RTP timestamp used for the measurement. | unsignedInt |
| measurementEndRTPTimestamp | A | M | 1 | The end time of the RTP timestamp used for the measurement. | unsignedInt |

TABLE 11

| Name | Type | Category | Cardinality | Description | Data Type |
|---|---|---|---|---|---|
| expectedTotalPackets | A | O | 0 . . . 1 | The total number of expected packets during measurement. | UnsignedInt |
| receivedTotalPackets | A | O | 0 . . . 1 | The total number of successfully received packets during measurement. | unsignedInt |
| lostTotalPackets | A | O | 0 . . . 1 | The total number of packets lost during measurement. | unsignedInt |
| recpetionRatio | A | M | 1 | The reception ratio during the measurement period. Calculated from expectedTotalPackets and receivedTotalPackets. | float |
| serviceArea | A | O | 0 . . . 1 | The area that the measurements were taken. | unsignedInt |
| cellID | A | O | 0 . . . 1 | The cell that the measurement were taken.<br>Note: Only applies to 3GPP/2 | unsignedInt |

In Table 9, the "StreamingReceptionReport" element, the uppermost element of the reception ratio report message for the streaming service, has the following elements and attributes. The "serverURI" indicates an address of the BSDA 300 that should receive a reception ratio report, and the "globalServiceID" is an identifier of the broadcast streaming service that underwent the reception ratio measurement, and is reported for use later for reception ratio classification and analysis in the BSDA 300.

The "DeviceID" is an identifier of the Terminal 303 that makes a reception ratio report, and it has, as its sub-attribute, a Type attribute indicating a type of the identifier. As the mobile broadcasting system such as BCAST can be used in various types of broadcast networks, there are various types of available terminals. Because not all of the terminals are compatible with each other, it is possible to notify the incompatibility using the Type attribute.

The "sessionID" is a session identifier of the service that underwent the reception ratio measurement, and is reported for use later for reception ratio classification and analysis in the BSDA 300. Because one service can be composed of several sessions, a plurality of the "sessionID" can be recorded, and it has a sub-element called "globalContentID" of Table 10. The "globalContentID" is an identifier of the contents of the service that underwent reception ratio measurement, and is reported for use later for reception ratio classification and analysis in the BSDA 300. Because one session can be composed of several contents, a plurality of the "globalContentID" can be recorded. The "globalContentID" has the following 9 attributes.

In Table 10, the "reportType" element is used to report the BSDA 300 which reception ratio measurement type was used in the Terminal 303. Based on the "reportType", the BSDA 300 can determine the manner in which the reception ratio information received from the Terminal 303 was measured, and it can be used for classifying and analyzing the reception ratio. The "measurementStartRTPTimestamp" element and the "measurementEndRTPTimestamp" element indicate the start and end periods where the measurement was made for the reception ratio report, respectively. The two values indicate timestamp values of the first RTP packet and the last RTP packet that the Terminal 303 actually receives for the reception ratio measurement by receiving the service.

In Table 11, the "expectedTotalPackets", "receivedTotalPackets" and "lostTotalPackets" indicate the total number of packets that the Terminal 303 should have received for the measurement interval, the total number of packets that the Terminal 303 has actually received, and the total number of packets that underwent loss or error, respectively. The "expectedTotalPackets" is the total number of packets that the Terminal 303 should have received for the period from the time the Terminal 303 started the measurement until the end time of the measurement, and can be obtained by calculating a difference between a timestamp of the start time and a timestamp of the end time. The "receivedTotalPackets" is the total number of packets that the Terminal 303 has actually received for the period in which it receives the "expectedTotalPackets". The "lostTotalPackets" is the total number of packets that the Terminal 303 has failed to receive for the period in which it receives the "expectedTotalPackets", or that the Terminal 303 has received but the received packets have undergone error. The foregoing "expectedTotalPackets", "receivedTotalPackets" and "lostTotalPackets" are optional attributes, and can be reference information for reception ratio classification and analysis and can be used for calculating the loss ratio.

The "receptionRatio" attribute can be calculated depending on the "expectedTotalPackets" and the "receivedTotalPackets" or the "lostTotalPackets", and indicates the total reception ratio occurred during the measurement interval. For example, the "receptionRatio" can be determined as a ratio of the "expectedTotalPackets" indicating the total number of expected packets, to the "receivedTotalPackets" indicating the total number of actually received packets. In addition, the packet loss ratio can be determined as a ratio of the "expectedTotalPackets" indicating the total number of expected packets, to the "lostTotalPackets" indicating the total number of lost packets. Based on the value in the "receptionratio" attribute, the BSDA 300 can comprehend the reception ratio of the Terminal 303. Upon receipt of a report on the reception ratio from multiple terminals through the attribute values, the BSDA 300 can analyze the reception ratio and take an appropriate action for quality improvement necessary for the corresponding service, thereby improving the service quality. Based on the reception ratio information received from the Terminal 303, the BSDA 300 can later control the service delivery efficiency. For example, when the reception ratio is high, the BSDA 300 can reduce the error coding rate to allocate the remaining bandwidth to additional services. Finally, "serviceArea" indicates the position where the Terminal 303 has measured the reception ratio, can be used for selecting the low-reception ratio area and is optional. The "cellID" indicates the cell where the Terminal 303 has measured a reception ratio when the Terminal 303 is connected to the 3GPP/3GPP2 network, can be used for selecting the low-reception ratio area and is optional.

Figure 4:
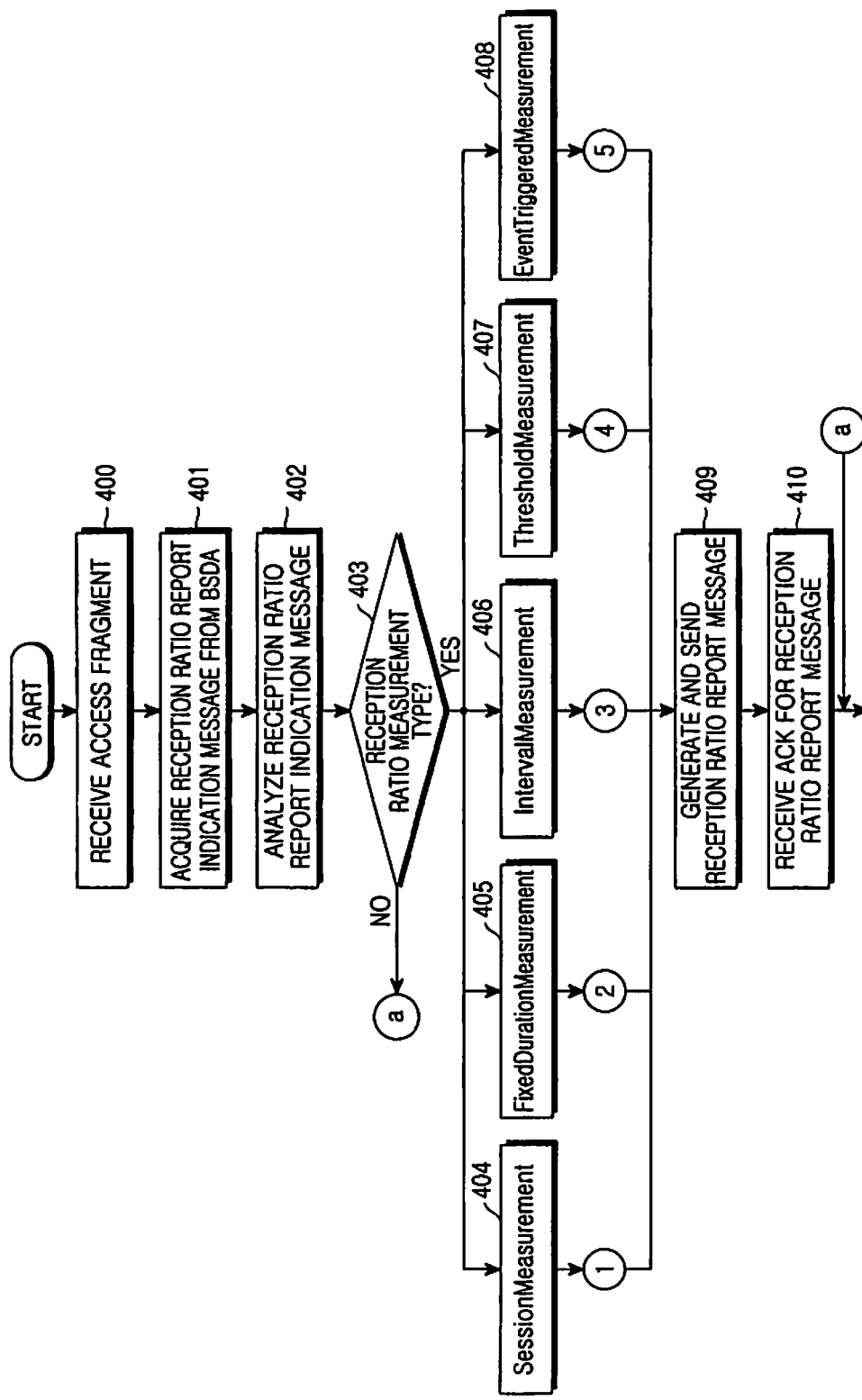
FIG. 4 illustrates a terminal's operation of reporting a reception ratio of a streaming service in a broadcasting system according to an embodiment of the present invention.

FIG. 4 illustrates a terminal's operation of reporting a reception ratio of a streaming service in a broadcasting system according to the present invention.

In step 400, a Terminal 303 receives an access fragment, which is a part of a service guide. Upon receiving the access fragment having the format of Tables 1 and 2 in step 400, the Terminal 303 determines presence/absence of a reception ratio report indication message according to presence of URI. In step 401, the Terminal 303 acquires a reception ratio report indication message via an Interaction Network 302 using the URI of step 400. In step 402, the Terminal 303 decrypts and analyzes the reception ratio report indication message acquired in step 401. Based on the reception ratio report indication message analyzed in step 402, the Terminal 303 performs, in step 403, reception ratio measurement according to the determined reception ratio measurement type, and particularly performs the reception ratio measurement according to the designated measurement type among the five measurement types 404 to 408 described below with reference to FIGS. 5 to 9. A detailed description of each measurement type will be made with reference to the corresponding diagram.

A brief description will first be made of the five reception ratio measurement types. Step 404 is a procedure performed when the measurement type in the reception ratio report indication message is designated as a SessionMeasurement element indicating the session measurement type. The 'session', which is defined by the service provider, indicates the start-to-end period in which the Terminal 303 receives contents. In step 404, the Terminal 303 measures a reception ratio for the entire service received over the session that it desires/expects to receive, and reports the measurement result to the BSDA 300. For the reception ratio measurement, the Terminal 303 performs measurement from the time it receives a first RTP packet of the service until the time it receives the last RTP packet. If the Terminal 303 accesses the broadcasting system after the time the session starts, or if the Terminal 303 releases the access for the corresponding service before the time the session ends, the Terminal 303 performs measurement for the time it receives the service.

Step 405 is a procedure performed when a measurement type in reception ratio report indication message is designated as a FixedDurationMeasurement element indicating the fixed duration measurement type. In step 405, the Terminal 303 performs reception ratio measurement for the service that it desires/expects to receive, for the duration designated in the reception ratio report indication message, and reports the measurement result to the BSDA 300. For the reception ratio measurement, the Terminal 303 receives and checks a timestamp of an RTP packet of the service on which it desires to perform the measurement, and performs the measurement, if the packet corresponds to a packet in the designated measurement interval. If the timestamp of the RTP packet deviates from the designated measurement interval, the Terminal 303 stops the measurement. If the Terminal 303 accesses the broadcasting system after the start time of the designated session, or releases the session access before the end time of the session, the Terminal 303 performs the measurement for the time it has received the service.

Step 406 is a procedure performed when the measurement type in the reception ratio report indication message is designated as an IntervalMeasurement element indicating the interval measurement type. In step 406, the Terminal 303 measures the reception ratio for the service that it desires/expects to receive over the session, every interval designated in the reception ratio report indication message, and reports the measured reception ratio to the BSDA 300. For the reception ratio measurement, the Terminal 303 continuously performs reception ratio measurement from the time it receives a first RTP packet of the service on which it desires to perform the measurement, and makes a reception ratio report every interval designated on the basis of a timestamp of the first RTP packet.

Step 407 is a procedure performed when the measurement type in the reception ratio report indication message is designated as a ThresholdMeasurement element indicating the threshold measurement type. In step 407, the Terminal 303 continuously measures the loss ratio from the time it receives a first RTP packet for the service that it desires/expects to receive over the session. In the meantime, if the loss ratio becomes less than a threshold set in the reception ratio report indication message, the Terminal 303 collects data for a reception ratio report, and if the loss ratio becomes greater than the threshold, the Terminal 303 reports the reception ratio to the BSDA 300. In step 407, the Terminal 303 continuously repeatedly calculates the reception ratio on the basis of the threshold while receiving the corresponding service, thereby continuously making the report.

Step 408 is a procedure performed when the measurement type in the reception ratio report indication message is designated as an EventTriggeredMeasurement element indicating the event triggered measurement type. In step 408, the Terminal 303 continuously measures the reception ratio and loss ratio from the time it receives a first RTP packet for the service that it desires/expects to receive. In the meantime, if the loss ratio becomes less than a trigger value in the reception ratio report indication message, the Terminal 303 collects data for the reception ratio report procedure for the reception ratio report, and if the loss ratio becomes greater than the trigger value, the Terminal 303 reports to the BSDA 300 the reception ratio measured and collected up to the time the corresponding service ends.

After measuring the reception ratio with one of the measurement types designated in steps 404 to 408, the Terminal 303 generates in step 409 a reception ratio report message shown in Tables 9 to 11 using the measured reception ratio information, and sends the reception ratio report message to the BSDA 300. Thereafter, if the BSDA 300, a network entity, receiving the reception ratio report message sent by the Terminal 303, sends an ACK message acknowledging the reception ratio report message, the Terminal 303 receives the ACK message in step 410. The operation of step 410 is optional.

In step 403, if the Terminal 303 has failed to check the determined reception ratio measurement type due to message reception failure, the Terminal 303 can end the reception ratio measurement operation as shown in FIG. 4, or can measure a reception ratio according to a preset default measurement type among the foregoing five measurement types. Although the disclosed embodiment prepares multiple measurement types and measures the reception ratio according to a designated one of them, when a single measurement type is predefined between the BSDA 300 and the Terminal 303, it is also possible to measure the reception ratio according to the predefined measurement type.

The terminal for reporting the reception ratio of the streaming service shown in FIG. 4 can include a message receiver for receiving a reception ratio report indication message having the format of Tables 1 to 5, a message transmitter for transmitting a reception ratio report message having the format of Tables 6 to 8 or the format of Tables 9 to 11, and a reception ratio measurer for measuring the reception ratio according to a measurement type designated in the reception ratio report indication message, and transmitting the measurement result to the broadcasting system using the reception ratio report message.

Figure 5:
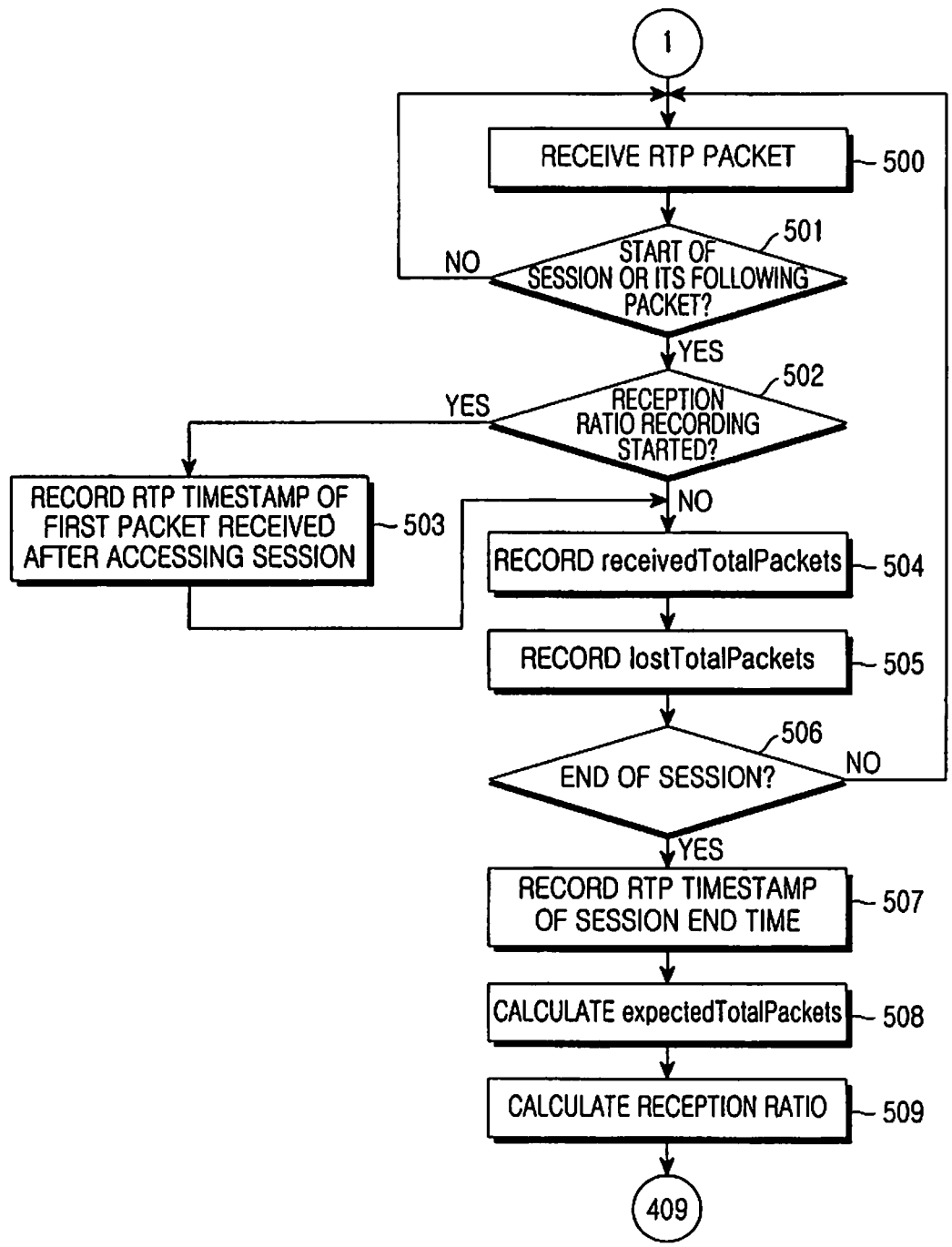
FIG. 5 illustrates a reception ratio measurement method for a streaming service according to a first embodiment of the present invention.

FIG. 5 illustrates a reception ratio measurement method for a streaming service according to a first embodiment of the present invention, and this method indicates the detailed "SessionMeasurement" process of step 404 in the terminal's operation of FIG. 4.

In step 500, a Terminal 303 receives an RTP packet of a desired service from a BSDA 300. After receiving the RTP packet in step 500, the Terminal 303 determines in step 501 whether the received packet is a first packet of the desired session, or its following packet. If the desired session has not started yet, the Terminal 303 continues to receive the RTP packet and check each packet. However, if the received packet is a packet of the desired session, the Terminal 303 checks in step 502 whether reception ratio recording is started. In step 502, the Terminal 303 checks whether it has recorded a start session RTP timestamp value in a measurementStartRTPTimestamp, to determine whether the reception ratio recording is started. If there is no recorded value, the Terminal 303 proceeds to step 503, because it means that the reception ratio recording is first started. If the reception ratio recording is first started, the Terminal 303 records in a measurementStartRTPTimestamp an RTPtimestamp of a first packet received after accessing the session, and separately records a sequence number as well in step 503, to later notify the record time. Thereafter, the Terminal 303 proceeds to step 504. After the reception ratio recording is started in step 502, the Terminal 303 records a receivedTotalPackets in step 504, and the receivedTotalPackets value is a counter that sequentially increases one by one each time the packet is received. Thereafter, in step 505, the Terminal 303 records in a lostTotalPackets the packets that it has received but which underwent error or loss. The Terminal 303 can detect the packet loss by comparing a sequence number of the received RTP packet with a sequence number of a previously received packet. In step 506, the Terminal 303 checks whether the received packet is the last packet of the desired session. If the received packet is not the last packet, the Terminal 303 returns to step 500 and repeats its succeeding steps. However, if the received packet is the last packet of the session, the Terminal 303 records in a measurementEndRTPTimestamp a timestamp of the last packet, and separately records a sequence number as well in step 507. In step 508, the Terminal 303 calculates the total number of packets that it should have received, and stores it in an expectedTotalPackets. This value is can be calculated depending on an RTP sequence number at the measurement start time and the last RTP sequence number. Finally, in step 509, the Terminal 303 calculates a reception ratio based on the receivedTotalPackets and the expectedTotalPackets, and then proceeds to step 409 of FIG. 4. For example, the Terminal 303 calculates the reception ratio depending on a ratio of the expectedTotalPackets to the receivedTotalPackets, and generates a reception ratio report message including the calculated reception ratio.

Figure 6:
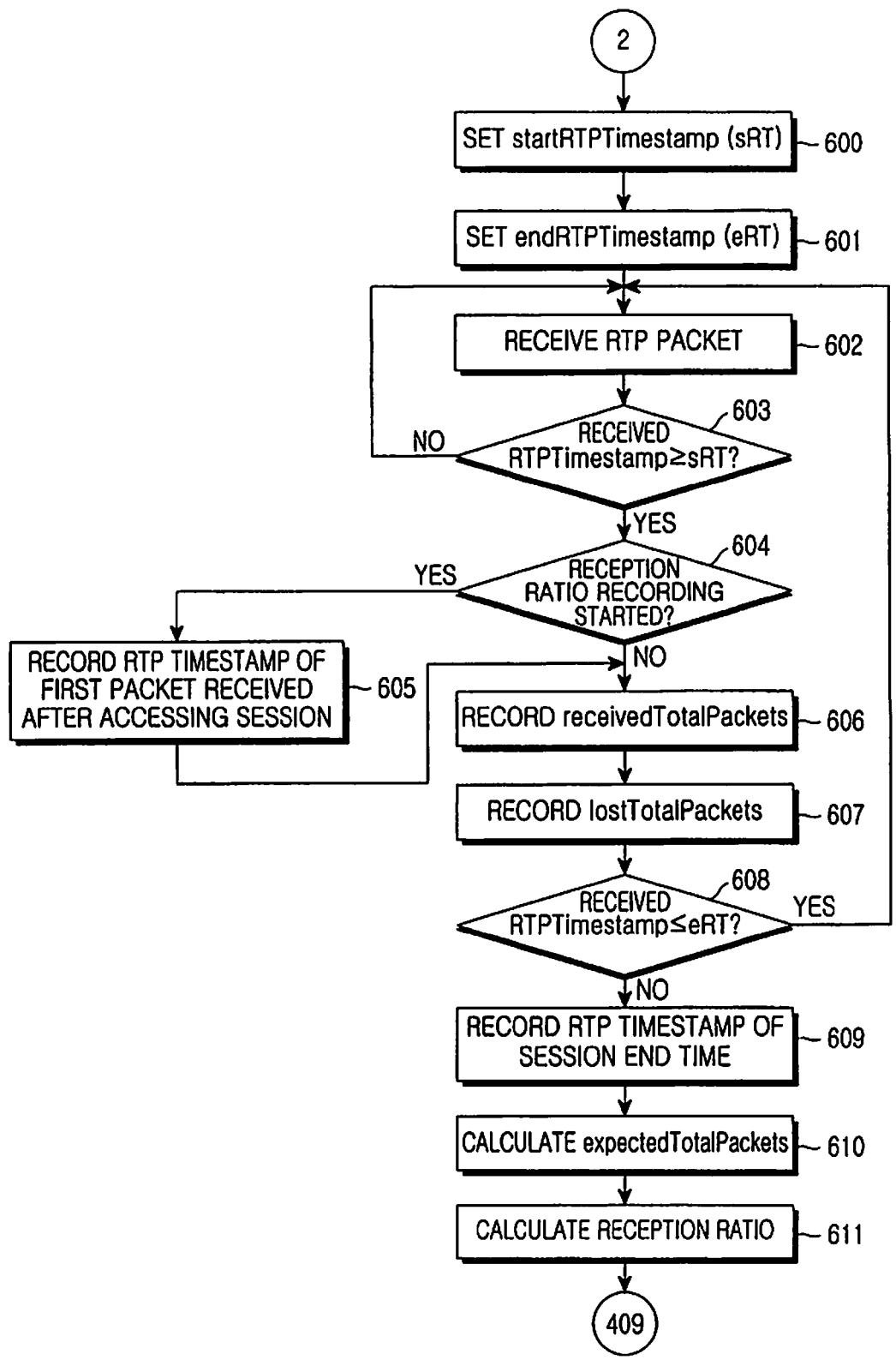
FIG. 6 illustrates a reception ratio measurement method for a streaming service according to a second embodiment of the present invention.

FIG. 6 illustrates a reception ratio measurement method for a streaming service according to a second embodiment of the present invention, and this method indicates the detailed "FixedDurationMeasurement" process of step 405 in the terminal's operation of FIG. 4.

In steps 600 and 601, a Terminal 303 receives and sets startRTPTimestamp(sRT) and endRTPTimestamp(eRT) values of the reception ratio report indication message described in Table 4. In the following process, the Terminal 303 measures a reception ratio for a RTP packet in the two timestamp values. After the setting of steps 600 and 601 is completed, the Terminal 303 receives an RTP packet of a desired service from a BSDA 300 in step 602, and compares a timestamp of the received RTP packet with the startRTPTimestamp in step 603 to determine whether the RTP packet received in step 602 corresponds to a timestamp value for starting reception ratio measurement. As a result of the comparison of step 603, if the Timestamp of the RTP packet received in step 602 is equal to or greater than the startRTPTimestamp, the Terminal 303 proceeds to step 604, starting the reception ratio measurement. Otherwise, the Terminal 303 returns to step 602. In step 604, the Terminal 303 checks whether reception ratio recording is started. The Terminal 303 can determine whether the reception ratio recording is started, by checking whether it has recorded a start session RTP timestamp value in a measurementStartRTPTimestamp. If there is no recorded value, the Terminal 303 proceeds to step 605, because it means that the reception ratio recording is first started. When the reception ratio recording is started, the Terminal 303 records in a measurementStartRTPTimestamp an RTPtimestamp of the packet received in step 602, and separately records a sequence number as well in step 605, to later notify the record time. If the reception ratio recording has been started, the Terminal 303 records a receivedTotalPackets in step 606. The value recorded in the receivedTotalPackets herein is a counter value that sequentially increases one by one each time the packet is received. Thereafter, in step 607, the Terminal 303 records in a lostTotalPackets the packets that it has received but which underwent error or loss. As for the lost packet, the Terminal 303 can determine whether the packet is lost by comparing a sequence number of the received RTP packet with a sequence number of a previously received packet. In step 608, the Terminal 303 compares an RTP timestamp of the received packet with the endRTPTimestamp set in step 601 to determine whether the received packet is the last packet that it has desired to measure. If the received packet in the step 602 is not the last packet, the Terminal 303 returns to step 602 and repeats its succeeding steps. In the step 608, if the RTPtimestamp of the received packet in the step 602 is equal to or less than the set endRTPTimestamp, it indicates that the received packet is not the last packet. If it is determined in step 608 that the received packet is the last packet, the Terminal 303 records in a measurementEndRTPTimestamp a timestamp of the last packet and separately records a sequence number as well in step 609. Thereafter, in step 610, the Terminal 303 calculates the total number of packets that it should have received, and stores it in an expectedTotalPackets. The expectedTotalPackets value can be calculated depending on the RTP sequence number of the packet received at the measurement start time and the sequence number of the last received packet. Finally, in step 611, the Terminal 303 calculates a reception ratio based on the receivedTotalPackets and the expectedTotalPackets, and then proceeds to step 409 of FIG. 4. For example, the Terminal 303 calculates the reception ratio depending on a ratio of the expectedTotalPackets to the receivedTotalPackets, and generates a reception ratio report message including the calculated reception ratio.

Figure 7:
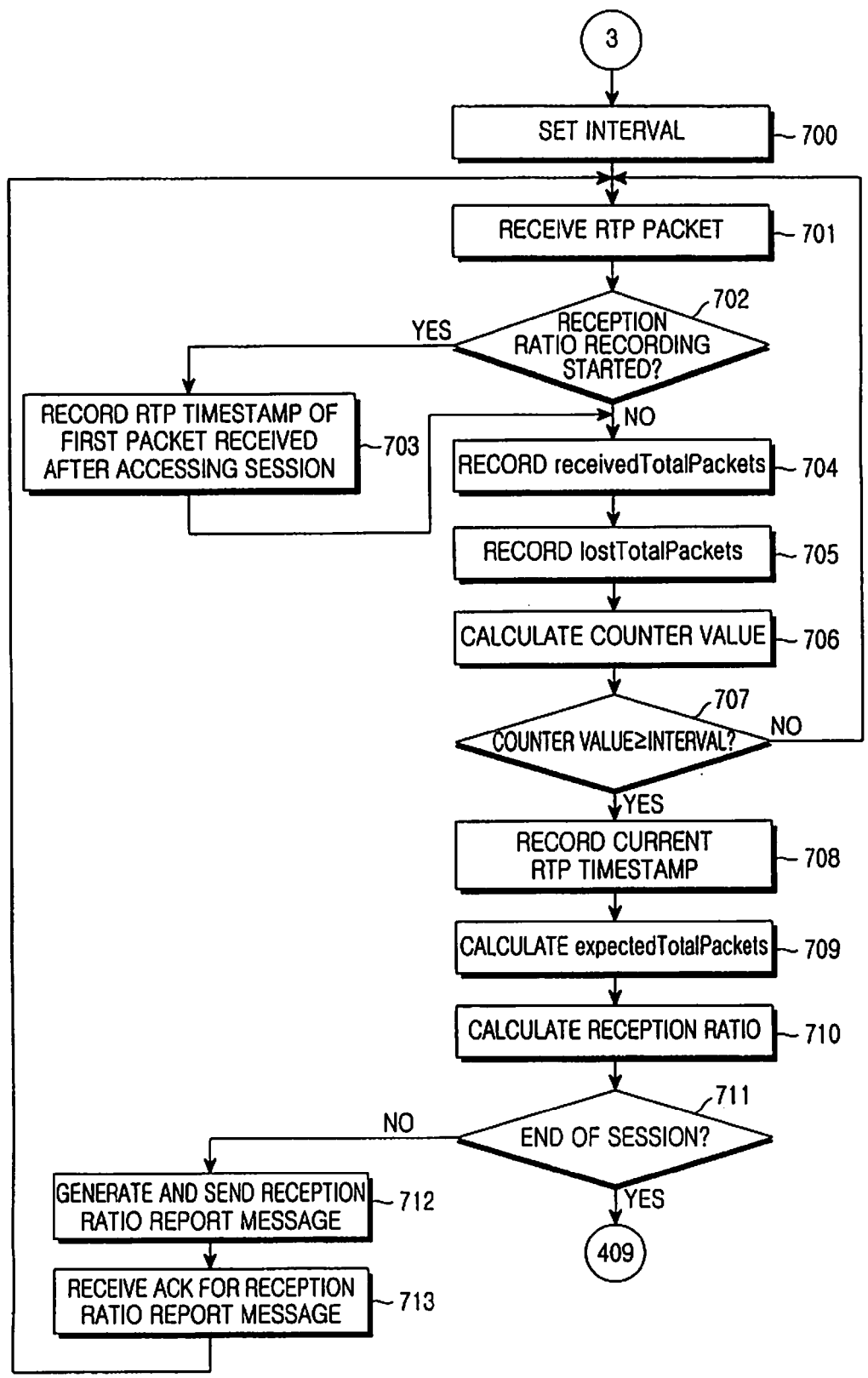
FIG. 7 illustrates a reception ratio measurement method for a streaming service according to a third embodiment of the present invention.

FIG. 7 illustrates a reception ratio measurement method for a streaming service according to a third embodiment of the present invention, and this method indicates the detailed "IntervalMeasurement" process of step 406 in the terminal's operation of FIG. 4.

In step 700, the Terminal 303 receives and sets an interval value set in the reception ratio report indication message described in Table 4. In this embodiment, the reception ratio report is periodically made on the basis of the set interval value. After setting the interval value in step 700, the Terminal 303 receives in step 701 an RTP packet of the desired service from a BSDA 300, and checks in step 702 whether reception ratio recording is started. In step 702, the Terminal 303 can determine whether the reception ratio recording is started, by checking whether it has recorded a start session RTP timestamp value in a measurementStartRTPTimestamp. If there is no recorded value, the Terminal 303 proceeds to step 703, because it means that the reception ratio recording is first started. When the reception ratio recording is first started, the Terminal 303 records in a measurementStartRTPTimestamp an RTPtimestamp of a packet first received after accessing the session, and separately records a sequence number as well in step 703, to later notify the record time. If the reception ratio recording has been started, the Terminal 303 records a receivedTotalPackets in step 704. The recorded receivedTotalPackets value herein is a counter value that sequentially increases one by one each time the packet is received. Thereafter, in step 705, the Terminal 303 records in a lostTotalPackets the packets that it has received but which underwent error or loss. The Terminal 303 can detect the lost packet by comparing a sequence number of the received RTP packet with a sequence number of a previously received packet. In step 706, the Terminal 303 calculates counter value on the basis of a timestamp of the received RTP packet. That is, the Terminal 303 prepares an interval counter and increases the counter value every time it receives a packet. Also, the interval counter is reset every time the reception ratio report message is transmitted. In step 707, the Terminal 303 compares the counter value calculated in step 706 with the interval value set in step 700. If the counter value calculated in step 706 is less than the interval value set in step 700, the Terminal 303 returns to step 701, and if the interval values are equal to each other, the Terminal 303 proceeds to step 708. In step 708, the Terminal 303 records in a measurementEndRTPTimestamp a timestamp of the received RTP packet, and separately records a sequence number as well. In step 709, the Terminal 303 calculates the total number of packets that it should have received, and records it in an expectedTotalPackets. The recorded expectedTotalPackets value can be calculated depending on the RTP sequence number of the packet received at a start time of the reception ratio measurement and the RTP sequence number of the last received packet.

In step 710, the Terminal 303 calculates a reception ratio depending on the receivedTotalPackets and the expectedTotalPackets. For example, the Terminal 303 calculates the reception ratio depending on a ratio of the expectedTotalPackets to the receivedTotalPackets, and generates a reception ratio report message including the calculated reception ratio. In step 711, the Terminal 303 determines whether the currently received packet is the last packet of its current service. If the current session is still in progress, the Terminal 303 proceeds to step 712 where it generates a reception ratio report message and sends it to the BSDA 300. In step 712, for the reception ratio report, the Terminal 303 generates the reception ratio report message by setting the elements and attributes defined in Tables 6 to 8, or Tables 9 to 11. After sending the generated reception ratio report message, the Terminal 303 can optionally receive a reception ratio report ACKnowledgement (ACK) from the BSDA 300, or a network entity, in step 713. Also, in the step 714, the terminal 303 initiates the counter value and performs reception ratio report. Thereafter, However, if it is determined in step 711 that the session has ended, the following operation proceeds to step 409 of FIG. 4. If the Terminal 303 ends the session before the session expires, the Terminal 303 generates a reception ratio report message based on the information up to the end time, and sends the generated reception ratio report message. Referring to FIG. 7, it can be noted that before the session ends, the Terminal 303 measures the reception ratio at every predetermined interval and reports the measurement result, and after the session ends, the Terminal 303 measures the reception ratio for the entire session and reports the measurement result.

Figure 8:
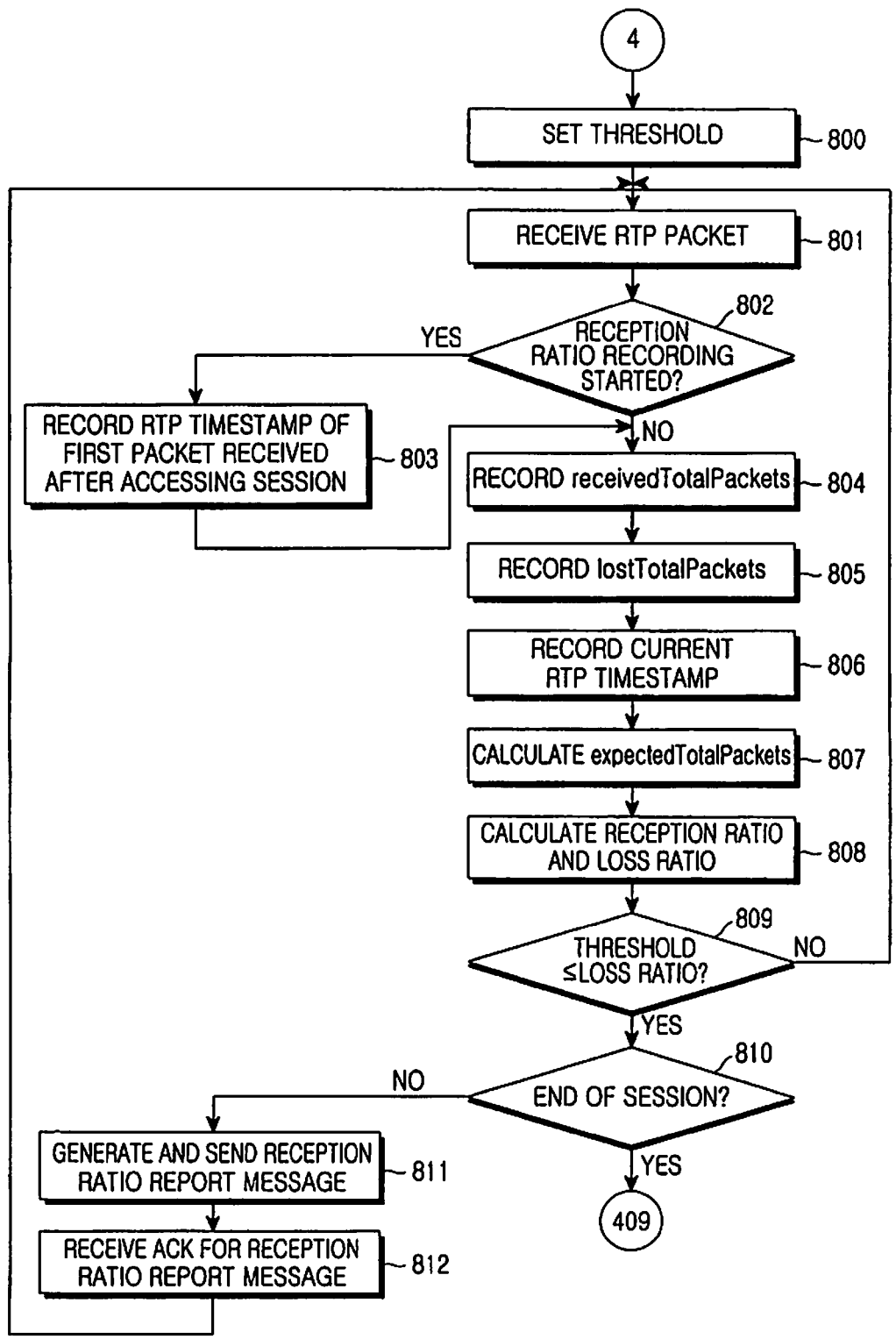
FIG. 8 illustrates a reception ratio measurement method for a streaming service according to a fourth embodiment of the present invention.

FIG. 8 illustrates a reception ratio measurement method for a streaming service according to a fourth embodiment of the present invention, and this method indicates the detailed "ThresholdMeasurement" process of step 407 in the terminal's operation of FIG. 4.

In step 800, the Terminal 303 sets a threshold to be compared with a loss ratio, as a threshold included in the reception ratio report indication message described in Table 5. In this embodiment, if a loss ratio calculated based on the set threshold becomes less than the threshold, the Terminal 303 collects information for the reception ratio report, and if the loss ratio becomes greater than threshold again, the Terminal 303 makes a reception ratio report. This reception ratio report operation is repeatedly performed until the session ends as a check result of step 810. After the setting in step 800 is completed, the Terminal 303 receives an RTP packet of the desired service from a BSDA 300 in step 801, and checks in step 802 whether reception ratio recording is started. In step 802, the Terminal 303 can determine whether the reception ratio recording is started, by checking whether it has recorded a start session RTP timestamp value in a measurementStartRTPTimestamp. If there is no recorded value, the Terminal 303 proceeds to step 803, because it means that the reception ratio recording is first started. When the reception ratio recording is first started, the Terminal 303 records in a measurementStartRTPTimestamp an RTPtimestamp of a packet first received after accessing the session, and separately records a sequence number as well in step 803, to later notify the record time. If the reception ratio recording has been started, the Terminal 303 records a receivedTotalPackets in step 804. The value recorded in the receivedTotalPackets herein is a counter value that sequentially increases one by one each time the packet is received. Thereafter, in step 805, the Terminal 303 records in a lostTotalPackets the packets that it has received but which underwent error or loss. The Terminal 303 can detect the lost packet by comparing a sequence number of the received RTP packet with a sequence number of a previously received packet. In step 806, the Terminal 303 records in a measurementEndRTPTimestamp a timestamp of the packet received in step 801, and separately records a sequence number as well. In step 807, the Terminal 303 calculates the total number of packets that it should have received, and records it in an expectedTotalPackets. The value recorded in the expectedTotalPackets can be calculated depending on the RTP sequence number of the packet received at a measurement start time of the terminal and the RTP sequence number of the last packet. In step 808, the Terminal 303 calculates the reception ratio and loss ratio depending on the receivedTotalPackets and the expectedTotalPackets. For example, the Terminal 303 calculates the reception ratio depending on a ratio of the expectedTotalPackets to the receivedTotalPackets, and calculates the loss ratio depending on a ratio of the expectedTotalPackets to the lostTotalPackets. In step 809, the Terminal 303 compares the loss ratio calculated in step 808 with the threshold. As a result of the comparison, if the loss ratio is less than the threshold, the Terminal 303 returns to step 801 because there is no need to make a report. However, if the loss ratio is greater than the threshold, the Terminal 303 proceeds to step 810 because there is a need for a reception ratio report. In step 810, the Terminal 303 determines whether the currently received packet is the last packet of the service that it is receiving over the session. If the session is still in progress, the Terminal 303 proceeds to step 811 where it generates a reception ratio report message for a reception ratio report and sends it to the BSDA 300. In step 811, for the reception ratio report, the Terminal 303 generates the reception ratio report message by setting the values calculated in steps 804 to 808 as the elements and attributes defined in Tables 6 to 8, or Tables 9 to 11. After sending the generated reception ratio report message, the Terminal 303 can optionally receive a reception ratio report ACK message from the BSDA 300 in step 812. However, if it is determined in step 810 that the session has ended, the Terminal 303 proceeds to step 409 of FIG. 4. Before the session ends as a check result of step 810, the Termninal 303 sends a reception ratio report message including the reception ratio measured each time the loss ratio is greater than the threshold. After the session ends as a check result of step 810, the Terminal 303 sends a reception ratio report message including the reception ratio measured during the entire session. If the Terminal 303 ends the session before the session expires, the Terminal 303 generates and sends a reception ratio report message based on the information up to the end time.

Figure 9:
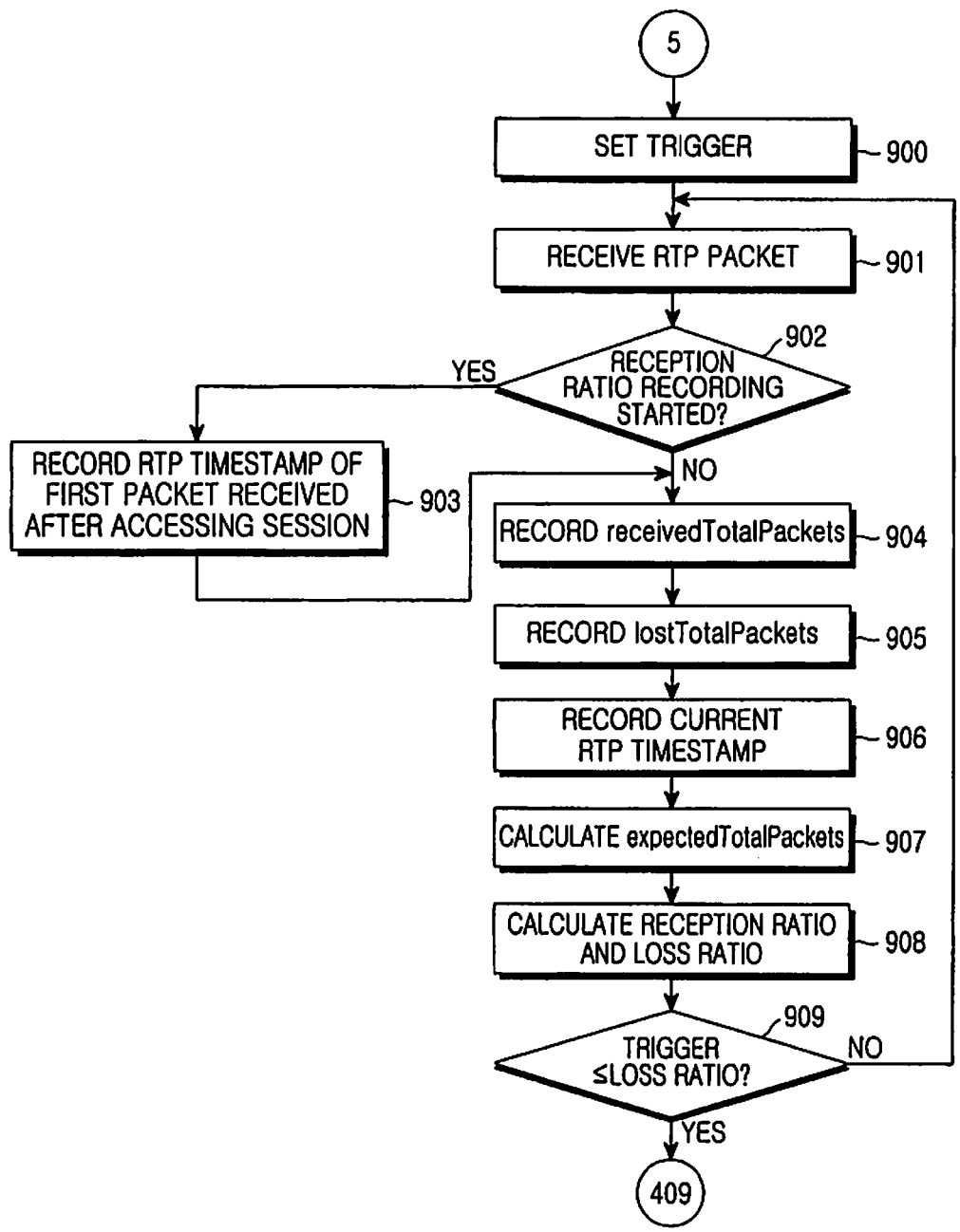
FIG. 9 illustrates a reception ratio measurement method for a streaming service according to a fifth embodiment of the present invention.

FIG. 9 illustrates a reception ratio measurement method for a streaming service according to a fifth embodiment of the present invention, and this method indicates the detailed "EventTriggeredMeasurement" process of step 408 in the terminal's operation of FIG. 4.

In step 900, a Terminal 303 sets a trigger value for generating a reception ratio report message according to a trigger value included in the reception ratio report indication message described in Table 5. In the fifth embodiment shown in FIG. 9, if a loss ratio measured on the basis of the set trigger value becomes less than the trigger value, information for a report is collected and the report is made at an end time of the session. The trigger value can be either a loss ratio or a reception ratio. In the present invention, the trigger value will be assumed to be a particular value compared by the terminal to make a reception ratio report. After setting the trigger value in step 900, the Terminal 303 receives an RTP packet of a desired service from a BSDA 300 in step 901, and checks in step 902 whether reception ratio recording is started. In step 902, the Terminal 303 can determine whether the reception ratio recording is started, by checking whether it has recorded a start session RTP timestamp value in a measurementStartRTPTimestamp. If there is no recorded value, the Terminal 303 proceeds to step 903, because it means that the reception ratio recording is first started. When the reception ratio recording is first started, the Terminal 303 records in a measurementStartRTPTimestamp a timestamp of a first packet received after accessing the session, and separately records a sequence number as well in step 903, to later notify the record time. If it is determined in step 902 that the reception ratio recording has already been started, the Terminal 303 records a receivedTotalPackets in step 904. The value recorded in the receivedTotalPackets herein is a counter value that sequentially increases one by one each time the packet is received. Thereafter, in step 905, the Terminal 303 records in a lostTotalPackets the packets that it has received but which underwent error or loss. The Terminal 303 can detect the lost packet by comparing a sequence number of the received RTP packet with a sequence number of a previously received packet. In step 906, the Terminal 303 records in a measurementEndRTPTimestamp a timestamp of the packet received in step 901, and separately records a sequence number as well. In step 907, the Terminal 303 calculates the total number of packets that it should have received for the entire session, and records it in an expectedTotalPackets. The value recorded in the expectedTotalPackets can be calculated depending on the RTP sequence number of the packet received at a measurement start time and the RTP sequence number of the last packet. Thereafter, in step 908, the Terminal 303 calculates a reception ratio depending on a ratio of the expectedTotalPackets to the receivedTotalPackets, and calculates a loss ratio depending on a ratio of the expectedTotalPackets to the lostTotalPackets. In step 909, the Terminal 303 compares the loss ratio calculated in step 908 with the trigger value set in step 900. If the loss ratio is less than the trigger value, the Terminal 303 returns to step 901 because there is no need to make a report. However, if it is determined in step 909 that the loss ratio is greater than the trigger value, the Terminal 303, because there is a need for the reception ratio report, proceeds to step 409 where it sends a reception ratio report message including the reception ratio. If the Terminal 303 ends the session before the session expires, the Terminal 303 generates and sends a reception ratio report message based on the information up to the end time. When the Terminal 303 sets both the trigger value and the threshold of FIGS. 8 and 9 as the loss ratio, the procedure of FIG. 8 repeatedly measures and sends the reception ratio if the measured loss ratio is greater than the threshold, whereas the procedure of FIG. 9 measures and sends the reception ratio only once when the loss ratio is greater than the trigger value. Although the trigger value is set as a predetermined loss ratio, to be compared with the loss ratio, other values can be set according to such variables as system operator, reception ratio, reception quality and base station characteristics.

Figure 10A:
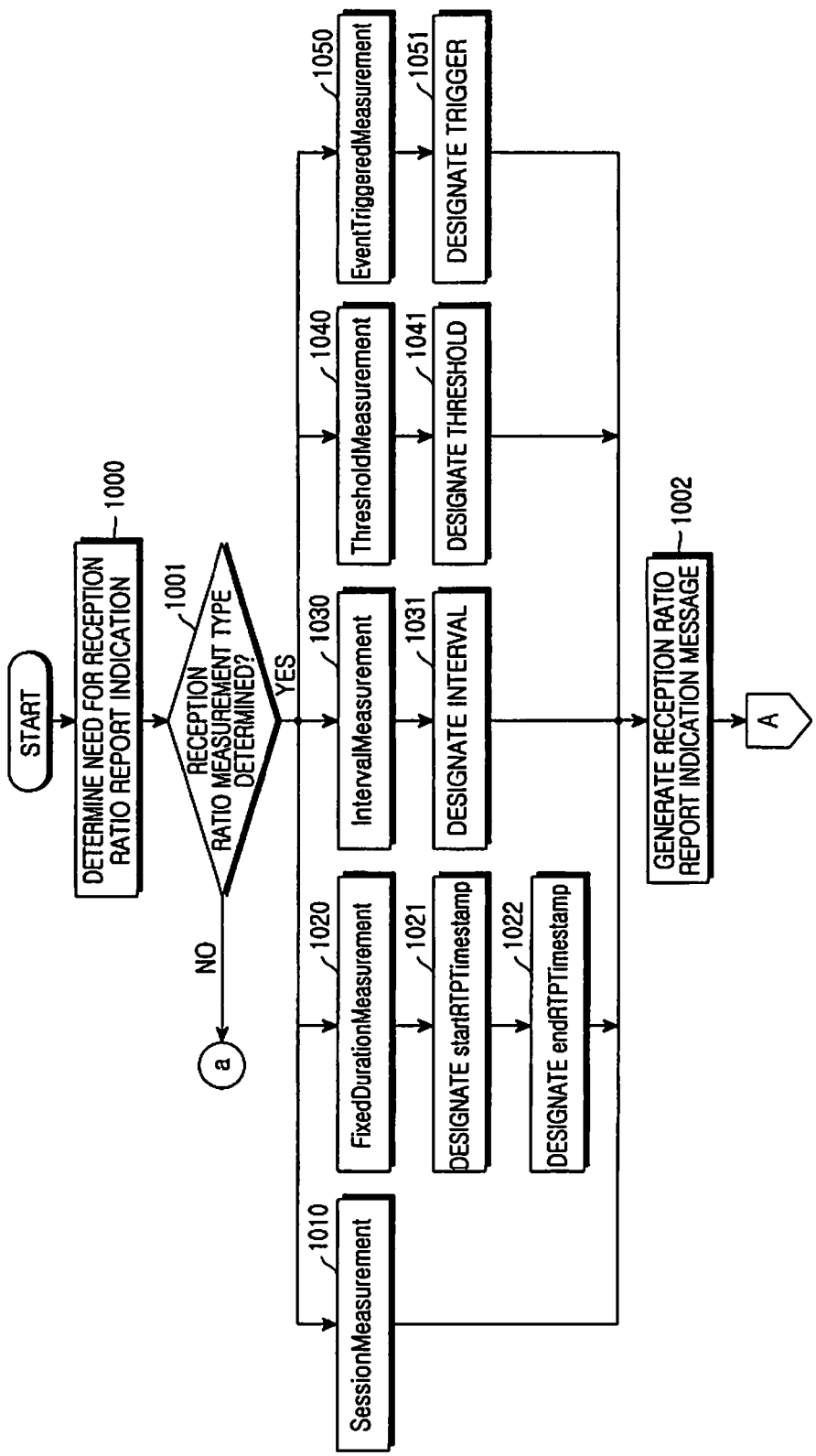
FIGS. 10A and 10B illustrate a BSDA's operation of sending a reception ratio report indication message for a streaming service to a terminal and receiving a response message thereto in a broadcasting system according to the present invention.
Figure 10B:
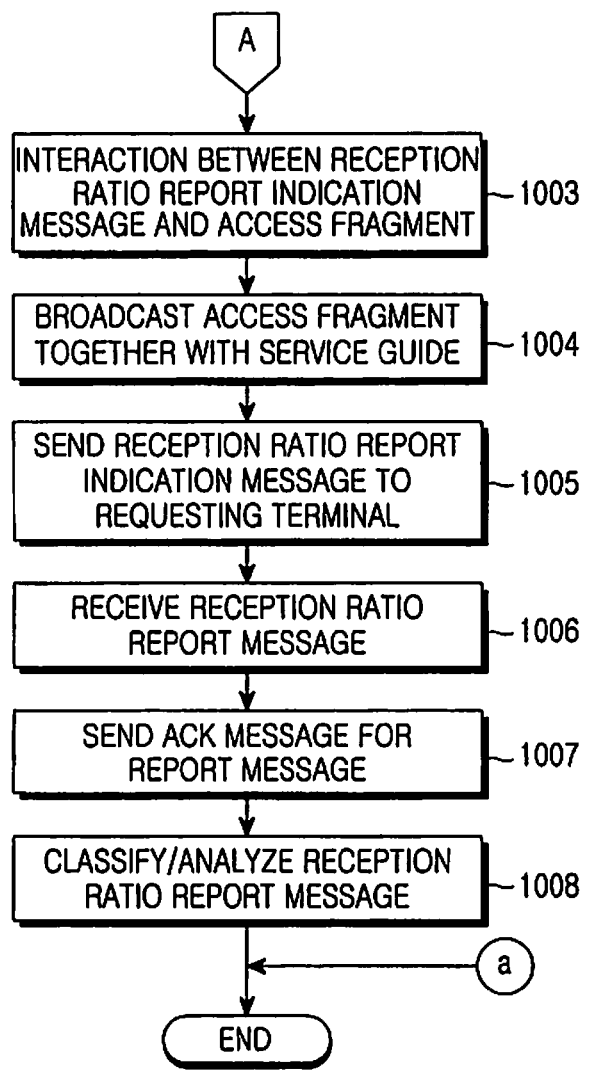

FIGS. 10A and 10B illustrate a BSDA's operation of sending a reception ratio report indication message for a streaming service to a terminal and receiving a response message thereto in a broadcasting system according to a the present invention.

In step 1000 of FIG. 10A, a BSDA 300 determines that there is a need for a reception ratio report on a particular service. In step 1001, the BSDA 300 determines detailed reception ratio measurement types for the reception ratio report. As described above, there are a total of five reception ratio measurement types, each of which being described in FIGS. 4 to 9. In steps 1010 to 1050, the BSDA 300, when the reception ratio measurement type is determined in step 1001, designates major items to be included in each reception ratio report indication message.

In step 1010, the BSDA 300 designates SessionMeasurement in a reception ratio report indication message so as to measure a reception ratio in units of sessions designated in step 1001. In step 1020, the BSDA 300 designates FixedDurationMeasurement in the reception ratio report indication message so as to measure a reception ratio for the duration designated in step 1001. In step 1001, if the BSDA 300 has failed to designate the reception ratio measurement type, it can perform end processing due to operation error as shown in FIG. 10B, or can designate a reception ratio measurement type according to a predetermined default measurement type among the foregoing five measurement types. Although this embodiment prepares multiple measurement types and designates one of the measurement types, the operation of step 1001 can be omitted when there is a single measurement type predefined between the BSDA 300 and the Terminal 303.

In steps 1021 and 1022, the BSDA 300 designates a measurement interval for measuring a packet reception ratio so as to support the measurement of step 1020. That is, BSDA 300 designates a measurement start time in step 1021, and designates a measurement end time in step 1022. The measurement start time and the measurement end time are designated in the same form so that they can be compared with an RTP timestamp. In step 1030, the BSDA 300 designates IntervalMeasurement in the reception ratio report indication message so as to measure a reception ratio every interval designated in step 1001. In step 1031, the BSDA 300 designates an interval for the reception ratio report so as to support the measurement of step 1030. The interval herein is designated on the basis of the number of RTP packets.

In step 1040, the BSDA 300 designates ThresholdMeasurement in the reception ratio report indication message so as to measure and report a reception ratio when a loss ratio is greater than a particular threshold designated in step 1001. In step 1041, the BSDA 300 designates a threshold so as to support the measurement of step 1040. The threshold herein is designated in percentage as it indicates a desired loss ratio to be compared with the loss ratio measured by the Terminal 303. In step 1050, if the loss ratio is greater than the trigger value in step 1001, the BSDA 300 designates EventTriggeredMeasurement in the reception ratio report indication message so as to continuously measure and report the reception ratio until the end time of the service the Terminal 303 receives. In step 1051, the BSDA 300 designates a trigger value so as to support the measurement of step 1050. The trigger value herein is designated in percentage as it indicates a desired loss ratio to be compared with the loss ratio.

If one of the five reception ratio measurement types is determined and values of the measurement support items are also determined in the foregoing process, the Terminal 303 generates a reception ratio report indication message in step 1002. If the reception ratio report indication message is generated in step 1002, the BSDA 300 allows the generated message to interact with an Access fragment 231 of a service guide in step 1003 of FIG. 10B so that the terminals can acquire the message. In step 1003, the interaction with the Access fragment 231 is achieved by registering in a URI attribute an address with which the terminals can receive the generated message. In step 1004, the BSDA 300 broadcasts the access fragment interacted in step 1003, along with the service guide. In step 1005, the BSDA 300 receives the service guide and the Access fragment 231, accesses the BSDA 300 using an address in the URI, and sends a reception ratio report indication message to the Terminal 303 that has requested the reception ratio report indication message. In step 1006, the BSDA 300 receives reception ratio report messages from the terminals that have performed the reception ratio measurement. In step 1007, the BSDA 300 sends an ACK for the reception ratio report message to the terminals. The operation of step 1007 is optional. Finally, in step 1008, the BSDA 300 classifies and analyzes the reception ratio report messages received from the Terminal 303.

Figure 11:
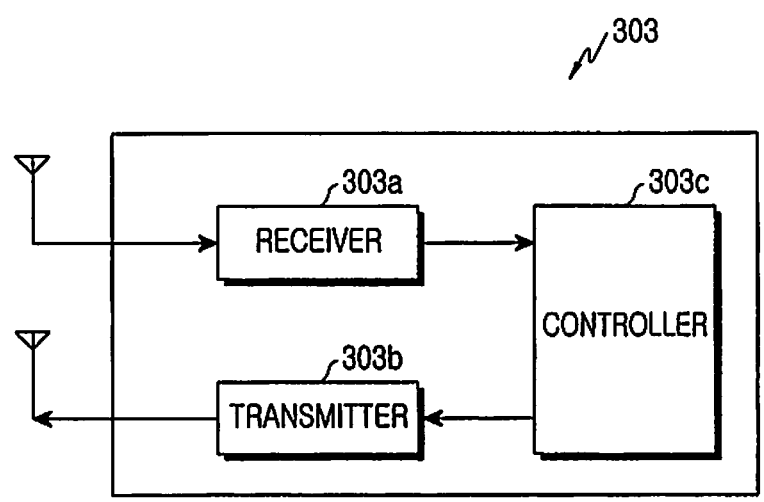
FIG. 11 is a block diagram illustrating a structure of a terminal according to the present invention.

FIG. 11 is a block diagram illustrating a structure of a terminal according to the present invention.

A receiver 303a according to an embodiment of the present invention receives a reception ratio report indication message indicating at least one measurement type of a reception ratio for a broadcast streaming service.

A controller 303c analyzes the reception ratio report indication message received by the receiver 303a and measures a reception ratio indicative of a ratio of an expectedTotalPackets indicating a total number of packets that the terminal expects to receive for a reception ratio measurement interval according to a reception ratio measurement type indicated by the reception ratio report indication message, to a receivedTotalPackets indicating a total number of packets that the terminal has received for the reception ratio measurement interval. In this case, the reception ratio measurement type performed by the controller 303c is same to the above mentioned measurement type.

First, if the measurement type indicated by the reception ratio report indication message is a session measurement type such that measurement of the reception ratio is performed over an entire session of the broadcast streaming service, the controller 303c measures a reception ratio over an entire session of the broadcast streaming service.

Second, if the measurement type indicated by the reception ratio report indication message is a fixed duration measurement type such that measurement of the reception ratio is performed for a fixed duration, the controller 303c measures a reception ratio for the broadcast streaming service for a duration between a start Real Time Transport Protocol(RTP) Timestamp attribute indicating a start time of the fixed duration and a end RTPtimestamp attribute indicating an end time of the fixed duration.

Third, if the measurement type indicated by the reception ratio report indication message is an interval measurement type such that measurement of the reception ratio is performed at an interval, the controller 303c measures a reception ratio for the broadcast streaming service at the interval.

Fourth, if the measurement type indicated by the reception ratio report indication message is a threshold measurement type such that measurement of the reception ratio is performed when a loss ratio indicative of a ratio of an expectedTotalPacktets indicating a total number of packets that the terminal expects to receive, to a lostTotalPackets indicating a total number of packets lost for the measurement interval is greater than a threshold, the controller 303c measures a reception ratio for the broadcast streaming service each time the loss ratio is greater than threshold.

Fifth, if the measurement type indicated by the reception ratio report indication message is an event triggered measurement type such that measurement of the reception ratio is performed when an event occurs, the controller 303c measures a reception ratio for the broadcast streaming service when the event occurs.

A transmitter 303b transmits a reception ratio report message including the reception ratio measured by the controller 303c.

As is apparent from the foregoing description, the present invention provides a detailed scheme in which a terminal reports a reception ratio upon receipt of a streaming service in the broadcasting system, contributing to improvement in the quality of broadcast service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for reporting a reception ratio of a broadcast service in a broadcasting system, the system comprising:

a network entity for sending a reception ratio report indication message indicating at least one of a plurality of measurement types of a reception ratio for a broadcast streaming service; and a terminal for receiving the reception ratio report indication message, and sending a reception ratio report message including the reception ratio indicative of a ratio of an expectedTotalPackets indicating a total number of packets that the terminal expects to receive for a reception ratio measurement interval according to the at least one of the plurality of measurement types indicated by the reception ratio report indication message, to a receivedTotalPackets indicating a total number of packets that the terminal has received for the reception ratio measurement interval, wherein the plurality of measurement types includes a session measurement type, a fixed duration measurement type, an interval measurement type, a threshold measurement type, and an event triggered measurement type.

2. The system of claim 1, wherein if the at least one of the plurality of measurement types is the session measurement type such that measurement of the reception ratio is performed over an entire session of the broadcast streaming service, a SessionMeasurement element indicating the session measurement is included in the reception ratio report indication message.

3. The system of claim 1, wherein if the at least one of the plurality of measurement types is the fixed duration measurement type such that measurement of the reception ratio is performed for a fixed duration, a FixedDurationMeasurement element indicating the fixed duration measurement, a startRTPTimestamp attribute indicating a start time of the fixed duration, and an endRTPTimestamp attribute indicating an end time of the fixed duration are included in the reception ratio report indication message.

4. The system of claim 1, wherein if the at least one of the plurality of measurement types is the interval measurement type such that measurement of the reception ratio is performed at predetermined interval, an IntervalMeasurement element indicating the interval measurement and an attribute indicating the interval are included in the reception ratio report indication message.

5. The system of claim 1, wherein if the at least one of the plurality of measurement types is the threshold measurement type such that measurement of such reception ratio is performed when a loss ratio indicative of a ratio of an expectedTotalPackets indicating a total number of packets that the terminal expects to receive, to a lostTotalPackets indicating a total number of packets lost for the measurement interval is greater than a threshold, a ThresholdMeasurement element indicating the threshold measurement, and an attribute indicating the threshold are included in the reception ratio report indication message.

6. The system of claim 1, wherein if the at least one of the plurality of measurement types is the event triggered measurement type such that measurement of the reception ratio is performed when a predetermined event occurs, an EventTriggeredMeasurement element indicating the event triggered measurement, and an attribute indicating a trigger value for triggering the event are included in the reception ratio report indication message.

7. The system of claim 1, wherein the reception ratio report message includes at least one of a globalService IDentifier (ID) attribute for identifying the broadcast streaming service that underwent the reception ratio measurement, a DeviceID element indicating an identifier of the terminal, an attribute for defining a type of the DeviceID element, a SessionID element for identifying a session over which the measurement is performed, a globalContentID element for identifying content that underwent the reception ratio measurement, a reportType attribute indicating a measurement type of the reception ratio, a measurementStart Real Time Transport Protocol (RTP)Timestamp attribute indicating a start time of the reception ratio measurement, and a measurementEndRTPTimestamp attribute indicating an end time of the reception ratio measurement.

8. The system of claim 7, wherein the reception ratio report message further includes at least one of an expectedTotalPackets indicating a total number of expected packets, a receivedTotalPackets indicating a total number of received packets, a lostTotalPackets attribute indicating a total number of packets either that the terminal has failed to receive, or that the terminal has received but the received packets have undergone error, a serviceArea attribute indicating an area where the reception ratio measurement is performed, and a cellID attribute indicating a cell where the reception ratio measurement is performed.

9. A terminal apparatus for reporting a reception ratio of a broadcast service in a broadcasting system, the terminal apparatus comprising:
  a receiver for receiving a reception ratio report indication message indicating at least one of a plurality of measurement types of a reception ratio for a broadcast streaming service;
  a controller for measuring a reception ratio indicative of a ratio of an expectedTotalPackets indicating a total number of packets that the terminal expects to receive for a reception ratio measurement interval according to the at least one of the plurality of measurement types indicated by the reception ratio report indication message, to a receivedTotalPackets indicating a total number of packets that the terminal has received for the reception ratio measurement interval; and
  a transmitter for sending the reception ratio report message including the measured reception ratio,
  wherein the plurality of measurement types includes a session measurement type, a fixed duration measurement type, an interval measurement type, a threshold measurement type, and an event triggered measurement type.

10. The terminal apparatus of claim 9, wherein if the at least one of the plurality of measurement types is the session measurement type such that measurement of the reception ratio is performed over an entire session of the broadcast streaming service, a SessionMeasurement element indicating the session measurement is included in the reception ratio report indication message.

11. The terminal apparatus of claim 10, wherein the controller measures a reception ratio over an entire session of the broadcast streaming service.

12. The terminal apparatus of claim 9, wherein if the at least one of the plurality of measurement types is the fixed duration measurement type such that measurement of the reception ratio is performed for a fixed duration, a FixedDurationMeasurement element indicating the fixed duration measurement, a start Real Time Transport Protocol (RTP) Timestamp attribute indicating a start time of the fixed duration, and an endRTPTimestamp attribute indicating an end time of the fixed duration are included in the reception ratio report indication message.

13. The terminal apparatus of claim 12, wherein the controller measures a reception ratio for the broadcast streaming service for a duration between the startRTPTimestamp and the endRTPTimestamp.

14. The terminal apparatus of claim 9, wherein if the at least one of the plurality of measurement types is the interval measurement type such that measurement of the reception ratio is performed at an interval, an IntervalMeasurement element indicating the interval measurement and an attribute indicating the interval are included in the reception ratio report indication message.

15. The terminal apparatus of claim 14, wherein the controller measures a reception ratio for the broadcast streaming service at the interval.

16. The terminal apparatus of claim 9, wherein if the at least one of the plurality of measurement types is the threshold measurement type such that measurement of the reception ratio is performed when a loss ratio indicative of a ratio of an expectedTotalPackets indicating a total number of packets that the terminal expects to receive, to a lostTotalPackets indicating a total number of packets lost for the measurement interval is greater than a threshold, a ThresholdMeasurement element indicating the threshold measurement, and an attribute indicating the threshold are included in the reception ratio report indication message.

17. The terminal apparatus of claim 16, wherein the controller measures a reception ratio for the broadcast streaming service each time the loss ratio is greater than the threshold.

18. The terminal apparatus of claim 9, wherein if the at least one of the plurality of measurement types is the event triggered measurement type such that measurement of the reception ratio is performed when an event occurs, an EventTriggeredMeasurement element indicating the event triggered measurement, and an attribute indicating a trigger value for triggering the event are included in the reception ratio report indication message.

19. The terminal apparatus of claim 18, wherein the controller measures a reception ratio for the broadcast streaming service when the event occurs.

20. The terminal apparatus of claim 9, wherein the reception ratio report message includes at least one of a globalService IDentifier (ID) attribute for identifying the broadcast streaming service that underwent the reception ratio measurement, a DeviceID element indicating an identifier of the terminal, an attribute for defining a type of the DeviceID element, a SessionID element for identifying a session over which the measurement is performed, a globalContentID element for identifying content that underwent the reception ratio measurement, a reportType attribute indicating a measurement type of the reception ratio, a measurementStart Real Time Transport Protocol (RTP)Timestamp attribute indicating a start time of the reception ratio measurement, and a measurementEndRTPTimestamp attribute indicating an end time of the reception ratio measurement.

21. The terminal apparatus of claim 20, wherein the reception ratio report message further includes at least one of an expectedTotalPackets indicating a total number of expected packets, a receivedTotalPackets indicating a total number of received packets, a lostTotalPackets attribute indicating a total number of packets either that the terminal has failed to receive, or that the terminal has received but the received packets have undergone error, a serviceArea attribute indicating an area where the reception ratio measurement is performed, and a cellID attribute indicating a cell where the reception ratio measurement is performed.

22. A method for reporting a reception ratio of a broadcast service by a terminal in a broadcasting system, the method comprising:
   receiving a reception ratio report indication message indicating at least one of a plurality of measurement types of a reception ratio for a broadcast streaming service;
   measuring a reception ratio indicative of a ratio of an expectedTotalPackets indicating a total number of packets that the terminal expects to receive for a reception ratio measurement interval according the at least one of the plurality of measurement types indicated by the reception ratio report indication message, to a receivedTotalPackets indicating a total number of packets that the terminal has received for the reception ratio measurement interval; and
   sending the reception ratio report message including the measured reception ratio,
   wherein the plurality of measurement types includes a session measurement type, a fixed duration measurement type, an interval measurement type, a threshold measurement type, and an event triggered measurement type.

23. The method of claim 22, wherein if the at least one of the plurality of measurement types is the session measurement type such that measurement of the reception ratio is performed over an entire session of the broadcast streaming service, a SessionMeasurement element indicating the session measurement is included in the reception ratio report indication message.

24. The method of claim 23, wherein the measuring of a reception ratio comprises:
   measuring a reception ratio over an entire session of the broadcast streaming service.

25. The method of claim 22, wherein if the at least one of the plurality of measurement types is the fixed duration measurement type such that measurement of the reception ratio is performed for a fixed duration, a FixedDurationMeasurement element indicating the fixed duration measurement, a start Real Time Transport Protocol (RTP)Timestamp attribute indicating a start time of the fixed duration, and an endRTPTimestamp attribute indicating an end time of the fixed duration are included in the reception ratio report indication message.

26. The method of claim 25, wherein the measuring of a reception ratio comprises:
   measuring a reception ratio for the broadcast streaming service for a duration between the startRTPTimestamp and the endRTPTimestamp.

27. The method of claim 22, wherein if the at least one of the plurality of measurement types is the interval measurement type such that measurement of the reception ratio is performed at an interval, an IntervalMeasurement element indicating the interval measurement and an attribute indicating the interval are included in the reception ratio report indication message.

28. The method of claim 27, wherein the measuring of a reception ratio comprises:
   measuring a reception ratio for the broadcast streaming service at the interval.

29. The method of claim 22, wherein if the at least one of the plurality of measurement types is the threshold measurement type such that measurement of the reception ratio is performed when a loss ratio indicative of a ratio of an expectedTotalPackets indicating a total number of packets that the terminal expects to receive, to a lostTotalPackets indicating a total number of packets lost for the measurement interval is greater than a threshold, a ThresholdMeasurement element indicating the threshold measurement, and an attribute indicating the threshold are included in the reception ratio report indication message.

30. The method of claim 29, wherein the measuring of a reception ratio comprises:
   measuring a reception ratio for the broadcast streaming service each time the loss ratio is greater than the threshold.

31. The method of claim 22, wherein if the at least one of the plurality of measurement types is the event triggered measurement type such that measurement of the reception ratio is performed when an event occurs, an EventTriggeredMeasurement element indicating the event triggered measurement, and an attribute indicating a trigger value for triggering the event are included in the reception ratio report indication message.

32. The method of claim 31, wherein the measuring of a reception ratio comprises:
   measuring a reception ratio for the broadcast streaming service when the event occurs.

33. The method of claim 22, wherein the reception ratio report message includes at least one of a globalService IDentifier (ID) attribute for identifying the broadcast streaming service that underwent the reception ratio measurement, a DeviceID element indicating an identifier of the terminal, an attribute for defining a type of the DeviceID element, a SessionID element for identifying a session over which the measurement is performed, a globalContentID element for identifying content that underwent the reception ratio measurement, a reportType attribute indicating a measurement type of the reception ratio, a measurementStart Real Time Transport Protocol (RTP)Timestamp attribute indicating a start time of the reception ratio measurement, and a measurementEndRTPTimestamp attribute indicating an end time of the reception ratio measurement.

34. The method of claim 33, wherein the reception ratio report message further includes at least one of an expectedTotalPackets indicating a total number of expected packets, a receivedTotalPackets indicating a total number of received packets, a lostTotalPackets attribute indicating a total number of packets either that the terminal has failed to receive, or that the terminal has received but the received packets have undergone error, a serviceArea attribute indicating an area where the reception ratio measurement is performed, and a cellID attribute indicating a cell where the reception ratio measurement is performed.

35. A method for receiving a report on a broadcast service reception ratio from a terminal by a network entity, the method comprising:
   determining at least one of a plurality of measurement types of a reception ratio for a broadcast streaming service;
   sending to the terminal a reception ratio report indication message indicating the determined at least one of the plurality of measurement types; and
   receiving from the terminal a reception ratio report message including the reception ratio indicative of a ratio of an expectedTotalPackets indicating a total number of packets that the terminal expects to receive for a reception ratio measurement interval according to the at least one of the plurality of measurement types measurement type, to a receivedTotalPackets indicating a total number of packets that the terminal has received for the reception ratio measurement interval,
   wherein the plurality of measurement types includes a session measurement type, a fixed duration measurement type, an interval measurement type, a threshold measurement type, and an event triggered measurement type.

36. The method of claim 35, wherein if the at least one of the plurality of measurement types is the session measurement type such that measurement of the reception ratio is performed over an entire session of the broadcast streaming service, a SessionMeasurement element indicating the session measurement is included in the reception ratio report indication message.

37. The method of claim 35, wherein if the at least one of the plurality of measurement types is the fixed duration measurement type such that measurement of the reception ratio is performed for a fixed duration, a FixedDurationMeasurement element indicating the fixed duration measurement, a start Real Time Transport Protocol (RTP)Timestamp attribute indicating a start time of the fixed duration, and an endRTPTimestamp attribute indicating an end time of the fixed duration are included in the reception ratio report indication message.

38. The method of claim 35, wherein if the at least one of the plurality of measurement types is the interval measurement type such that measurement of the reception ratio is performed at an interval, an IntervalMeasurement element indicating the interval measurement and an attribute indicating the interval are included in the reception ratio report indication message.

39. The method of claim 35, wherein if the at least one of the plurality of measurement types is the threshold measurement type such that measurement of the reception ratio is performed when a loss ratio indicative of a ratio of an expectedTotalPackets indicating a total number of packets that the terminal expects to receive, to a lostTotalPackets indicating a total number of packets lost for the measurement interval is greater than a threshold, a ThresholdMeasurement element indicating the threshold measurement, and an attribute indicating the threshold are included in the reception ratio report indication message.

40. The method of claim 35, wherein if the at least one of the plurality of measurement types is the event triggered measurement type such that measurement of the reception ratio is performed when an event occurs, an EventTriggeredMeasurement element indicating the event triggered measurement, and an attribute indicating a trigger value for triggering the event are included in the reception ratio report indication message.

41. The method of claim 35, wherein the reception ratio report message includes at least one of a globalService IDentifier (ID) attribute for identifying the broadcast streaming service that underwent the reception ratio measurement, a DeviceID element indicating an identifier of the terminal, an attribute for defining a type of the DeviceID element, a SessionID element for identifying a session over which the measurement is performed, a globalContentID element for identifying content that underwent the reception ratio measurement, a reportType attribute indicating a measurement type of the reception ratio, a measurementStart Real Time Transport Protocol (RTP)Timestamp attribute indicating a start time of the reception ratio measurement, and a measurementEndRTPTimestamp attribute indicating an end time of the reception ratio measurement.

42. The method of claim 41, wherein the reception ratio report message further includes at least one of an expectedTotalPackets indicating a total number of expected packets, a receivedTotalPackets indicating a total number of received packets, a lostTotalPackets attribute indicating a total number of packets either that the terminal has failed to receive, or that the terminal has received but the received packets have undergone error, a serviceArea attribute indicating an area where the reception ratio measurement is performed, and a cellID attribute indicating a cell where the reception ratio measurement is performed.

* * * * *